(12) United States Patent
Moore et al.

(10) Patent No.: US 11,830,317 B2
(45) Date of Patent: Nov. 28, 2023

(54) SYSTEMS AND METHODS FOR DISTINGUISHING MULTIPLE DISTINCT WAGERS AT A SINGLE BET SPOT OF A GAME TABLE

(71) Applicant: Walker Digital Table Systems, LLC, Las Vegas, NV (US)

(72) Inventors: Stephen Moore, Las Vegas, NV (US); Carolyn Moore, Las Vegas, NV (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 164 days.

(21) Appl. No.: 17/463,463

(22) Filed: Aug. 31, 2021

(65) Prior Publication Data

US 2021/0390819 A1 Dec. 16, 2021

Related U.S. Application Data

(63) Continuation of application No. 16/737,805, filed on Jan. 8, 2020, now Pat. No. 11,107,315, which is a (Continued)

(51) Int. Cl.
*G07F 17/32* (2006.01)
*G06K 5/00* (2006.01)
(Continued)

(52) U.S. Cl.
CPC ............. *G07F 17/322* (2013.01); *A63F 1/00* (2013.01); *A63F 1/06* (2013.01); *A63F 1/067* (2013.01);
(Continued)

(58) Field of Classification Search
None
See application file for complete search history.

(56) References Cited

U.S. PATENT DOCUMENTS

| 4,814,589 A | 3/1989 | Storch et al. |
| 5,103,081 A | 4/1992 | Fisher et al. |

(Continued)

OTHER PUBLICATIONS

International Search Report for Application No. PCT/US17/031450 dated Jul. 17, 2017; 2 pps.
(Continued)

*Primary Examiner* — Reginald A Renwick
(74) *Attorney, Agent, or Firm* — RowanTree Law Group, PLLC; Magdalena M. Fincham

(57) ABSTRACT

In accordance with some embodiments there is provided an electronic gaming table system (e.g., a smart table operable to facilitate a card game, such as baccarat, blackjack or poker) which includes (i) at least one detecting mechanism for detecting a plurality of game elements (e.g., wagering chips) placed on, or removed from, a particular physical position of a physical table of the gaming table system to represent at least one wager for a particular game event; and (ii) a game controller operable to identify, based at least on data received from the at least one detecting mechanism, whether the plurality of game elements represent a single wager or multiple distinct wagers placed on the particular physical position and for the particular game event. In some embodiments, the detecting mechanism is an RFID antenna.

23 Claims, 13 Drawing Sheets

Related U.S. Application Data continuation of application No. 16/175,826, filed on Oct. 30, 2018, now Pat. No. 10,540,843, which is a continuation of application No. PCT/US2017/031450, filed on May 5, 2017.

(60) Provisional application No. 62/332,415, filed on May 5, 2016.

(51) Int. Cl.
| | |
|---|---|
| *G06K 7/10* | (2006.01) |
| *A63F 1/00* | (2006.01) |
| *A63F 1/14* | (2006.01) |
| *A63F 1/06* | (2006.01) |
| *A63F 3/00* | (2006.01) |
| *G06K 19/04* | (2006.01) |

(52) U.S. Cl.
CPC ............ *A63F 1/14* (2013.01); *A63F 3/00157* (2013.01); *G06K 5/00* (2013.01); *G06K 7/10* (2013.01); *G07F 17/3211* (2013.01); *G07F 17/3248* (2013.01); *G07F 17/3293* (2013.01); *A63F 2003/00164* (2013.01); *A63F 2003/00996* (2013.01); *G06K 19/047* (2013.01)

(56) References Cited

U.S. PATENT DOCUMENTS

| | | | |
|---|---|---|---|
| 8,092,293 | B2 | 1/2012 | Richards et al. |
| 8,920,229 | B1 | 12/2014 | Chun |
| 2010/0009742 | A1 | 1/2010 | Popovich et al. |
| 2013/0190076 | A1* | 7/2013 | Sammon ............. G07F 17/3251 463/25 |
| 2013/0244763 | A1 | 9/2013 | Baerlocher |
| 2013/0252564 | A1 | 9/2013 | Zolfaghare et al. |
| 2016/0016071 | A1 | 1/2016 | Walker et al. |

OTHER PUBLICATIONS

Written Opinion for Application No. PCT/US17/031450 dated Jul. 17, 2017; 14 pps.
Notice of Allowance for U.S. Appl. No. 16/175,826 dated Oct. 7, 2019; 7 pps.
International Preliminary Report on Patentability for PCT/US17/031450 dated Nov. 15, 2018; 7 pps.
Examination Report No. 1 for Australian Application No. 2017261375 dated Mar. 15, 2021. 6 pps.
Notice of Allowance for U.S. Appl. No. 16/727,805 dated Jan. 19, 2021; 7 pps.
Notice of Allowance for U.S. Appl. No. 16/727,805 dated May 5, 2021; 7 pps.

* cited by examiner

SYSTEMS AND METHODS FOR DISTINGUISHING MULTIPLE DISTINCT WAGERS AT A SINGLE BET SPOT OF A GAME TABLE

CLAIM OF PRIORITY

This application is a Continuation Application of U.S. patent application Ser. No. 16/737,805, filed Jan. 8, 2020 in the name of Stephen Moore et al. and titled SYSTEMS AND METHODS FOR DISTINGUISHING MULTIPLE DISTINCT WAGERS AT A SINGLE BET SPOT OF A GAME TABLE, which was issued as U.S. Pat. No. 11,107,315 on Aug. 31, 2021 and which is a Continuation Application of U.S. patent application Ser. No. 16/175,826, filed Oct. 30, 2018 in the name of Stephen Moore et al. and titled SYSTEMS AND METHODS FOR DISTINGUISHING MULTIPLE DISTINCT WAGERS AT A SINGLE BET SPOT OF A GAME TABLE and issued as U.S. Pat. No. 10,540,843 on Jan. 21, 2020, which Application is a Continuation Application of PCT Application No. PCT/US17/031450, filed May 5, 2017 in the name of Stephen Moore et al. and titled SYSTEMS AND METHODS FOR DISTINGUISHING MULTIPLE DISTINCT WAGERS AT A SINGLE BET SPOT OF A GAME TABLE; PCT Application No. PCT/US17/031450 claims the benefit of U.S. Provisional Application No. 62/332,415, filed May 5, 2016 in the name of Stephen Moore et al. and titled SYSTEMS AND METHODS FOR UTILIZING RFID TECHNOLOGY TO DISTINGUISH MULTIPLE DISTINCT EVENTS DETECTED BY A COMMON RFID INTERROGATOR. The entirety of each of these applications is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY

Some of the embodiments provided herein are directed to an electronic gaming table system (e.g., a smart table operable to facilitate a card game, such as baccarat, blackjack or poker) which includes (i) at least one detecting mechanism for detecting a plurality of game elements (e.g., wagering chips) placed on, or removed from, a particular physical position of a physical table of the gaming table system; and (ii) a game controller operable to identify, based at least on data received from the at least one detecting mechanism, whether the plurality of game elements represent a single wager or multiple distinct wagers placed on the particular physical position. In some embodiments, the electronic table system is further operable to track and update for a particular physical table wagering data via a plurality of virtual wager placement positions represented on a virtual representation of the physical table, at least some of which virtual wager placement positions correspond to physical wager placement positions of the physical table. In such embodiments the number of virtual wager placement positions of the virtual table may in some circumstances exceed the number of physical wager placement positions at the corresponding physical table (e.g., virtual wager placement positions may be added to the virtual table representation of the physical table in order to represent wagers made by remote or back bettors or multiple distinct wagers placed on a single physical wager placement position).

DETAILED DESCRIPTION OF EXAMPLE EMBODIMENTS

Figure 1:
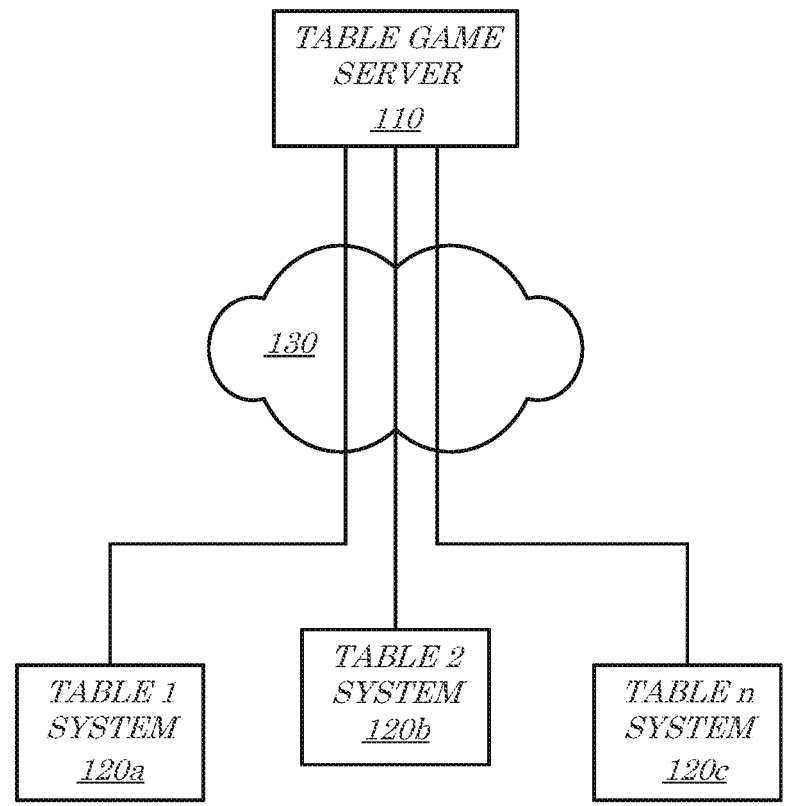
FIG. 1 illustrates an example system operable to facilitate at least some embodiments described herein.

The present embodiments are directed to tracking of activity at table games and within a gaming establishment, using radio frequency identification (RFID) technology or optical reading technology to track and manage RFID-enabled or other identifiable wagering chips and wagering activity utilizing such chips and particularly to tracking and managing the payments collected and payouts provided for multiple distinct wagers placed on a common wagering area of a table (e.g., a common wagering area which has a single RFID antenna or other detecting component associated therewith, such as a Player or Banker bet spot at a given player position of a baccarat card game, a Tie bet spot). In some embodiments, systems are provided which perform functions responsive to data obtained via a detecting component of the table, such as an RFID antenna operable to read data from RFID-enabled chips or an optical reading component operable to read data from a wagering chip having optical data encoded thereon.

It should be noted that a "bet spot" or a "wager placement position", whether physical or virtual, refers to an area of a card game table or an area of a virtual card game representation (e.g., a graphical representation of a virtual table) on which a representation or indication of a wager may be placed or output. Thus, for example, a bet spot or wager placement position may comprise a specifically designated or identifiable area on which a person (e.g., player or dealer) may place at least one gaming element (e.g., a wagering chip or token) to indicate placement of a wager. It should further be noted that a gaming element may be a physical wagering element (e.g., a physical wagering chip, in the context of a physical table) or a virtual wagering element (e.g., a graphical representation of a wagering chip, as may be depicted on a graphical representation of a virtual table). In some embodiments, reference is made to "wagering chips" which reference should be understood to refer to either physical wagering chips or virtual wagering chips, depending on the context. Although at times embodiments are described with reference to wagering chips, such embodiments can also be implemented using other types of gaming elements (e.g., tokens, lammers, etc.) useful for indicating placement of a wager and the embodiments described herein are not dependent on any particular form of gaming element for indicating placement of a wager.

In one embodiment, functions responsive to data obtained from wagering chips may comprise, for example, (i) managing, detecting and/or tracking multiple distinct wagers (e.g., each such wager being placed by a different player, being associated with a different wagering stack or a different bankroll) placed on a common or shared wager placement position of a table; (ii) directing dealer and/or player activity; (iii) tracking chips paid and taken (e.g., by a dealer); (iv) associating wagers, chips or stacks of chips with particular players or wager placement positions; and/or (v) managing, detecting and/or tracking payouts made as a result of wagers (or chips collected based on such wagers that are losing wagers). In accordance with some embodiments, wager result activity (e.g., payout made or wager/fee collected) may be attributed to a particular wager, particular wager placement position, particular player position and/or particular player based on an order in which wagering chips or stacks of wagering chips are removed from the shared or common wager placement position.

In accordance with some embodiments, wagering chips that are detectable at a smart table comprise RFID-enabled wagering chips that include RFID components operable to store data readable by an RFID detecting component (e.g., an antenna). In other embodiments, wagering chips that are detectable at a smart table comprise wagering chips that include optically readable data that is readable by an optical imaging component (e.g., an imager or camera). In either embodiment, the detecting component (whether it be an RFID detecting component or an optical imaging component) may be operable to communicate data it receives from the wagering chips, or determines from the wagering chips, to a game controller or processor. For purposes of clarity, some embodiments will be described herein with reference to RFID-enabled wagering chips but it should be understood that such embodiments may also be implemented using wagering chips or other gaming elements having optically readable data encoded or represented thereon and an optical imaging detecting component in lieu of the RFID technology.

In some embodiments, functions responsive to data obtained from wagering chips via a detecting component may include creating a virtual bet spot (also referred to as a virtual wager placement position herein) in response to detecting the RFID-enabled chip (or stack of chips) at a smart table. The creation of a virtual bet spot, in the memory or software of the table, may be independent of table layout design or location of the chip(s) or stack of chip(s) (in other embodiments the creation of a virtual bet spot may be at least partially dependent on the physical table layout). This may allow, for example, for multiple players to place wagers on the same or common physical bet spot or physical wager placement position (e.g., in a physical location of a physical table that is associated with a single RFID antenna or other detecting component) as designated on the felt layout of a physical table. In one embodiment, a player who places a wager on a bet spot or wager placement position on which another player has already placed a wager (such that two distinct wagers from two distinct players are detected on the same bet spot or same physical wager placement position of a physical table) may be a remote player (i.e., a player who is not physically present at the table or who is standing behind or near a primary player associated with a physical wager placement position). For example, in some embodiments a dealer may place physical wagering chips on a physical bet spot or physical wager placement position of a physical table to represent a wager made by a remote player. For example, the dealer may receive information via a dealer display of the table, informing him/her of the remote bet and instructing him/her to place the appropriate physical wagering chips on a particular physical wager placement position of the table such that other players physically present at the physical table can see that the wager by the remote player has been made.

Figure 5:
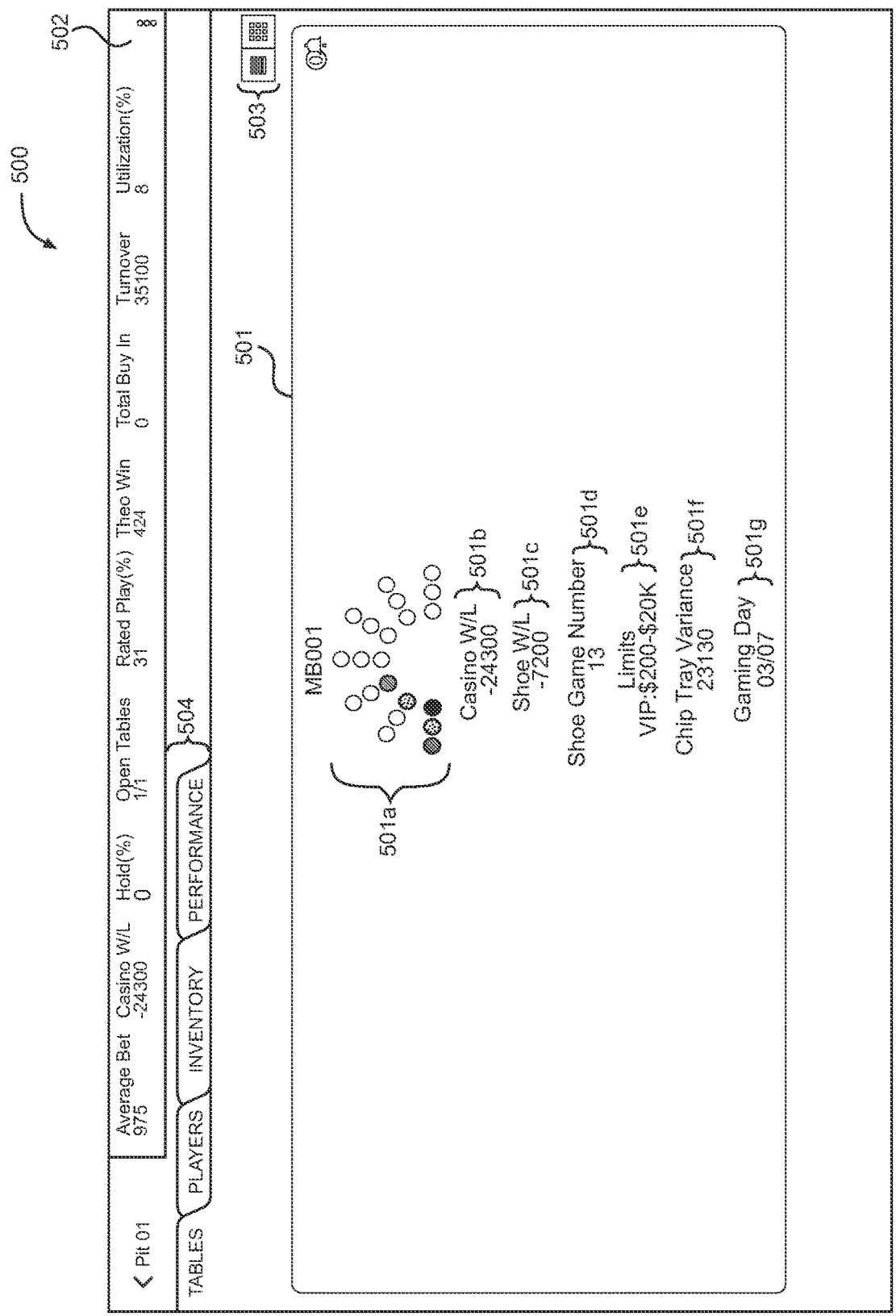
FIG. 5 illustrates an example user interface that may be output to casino personnel, in accordance with some embodiments described herein.
Figure 6:
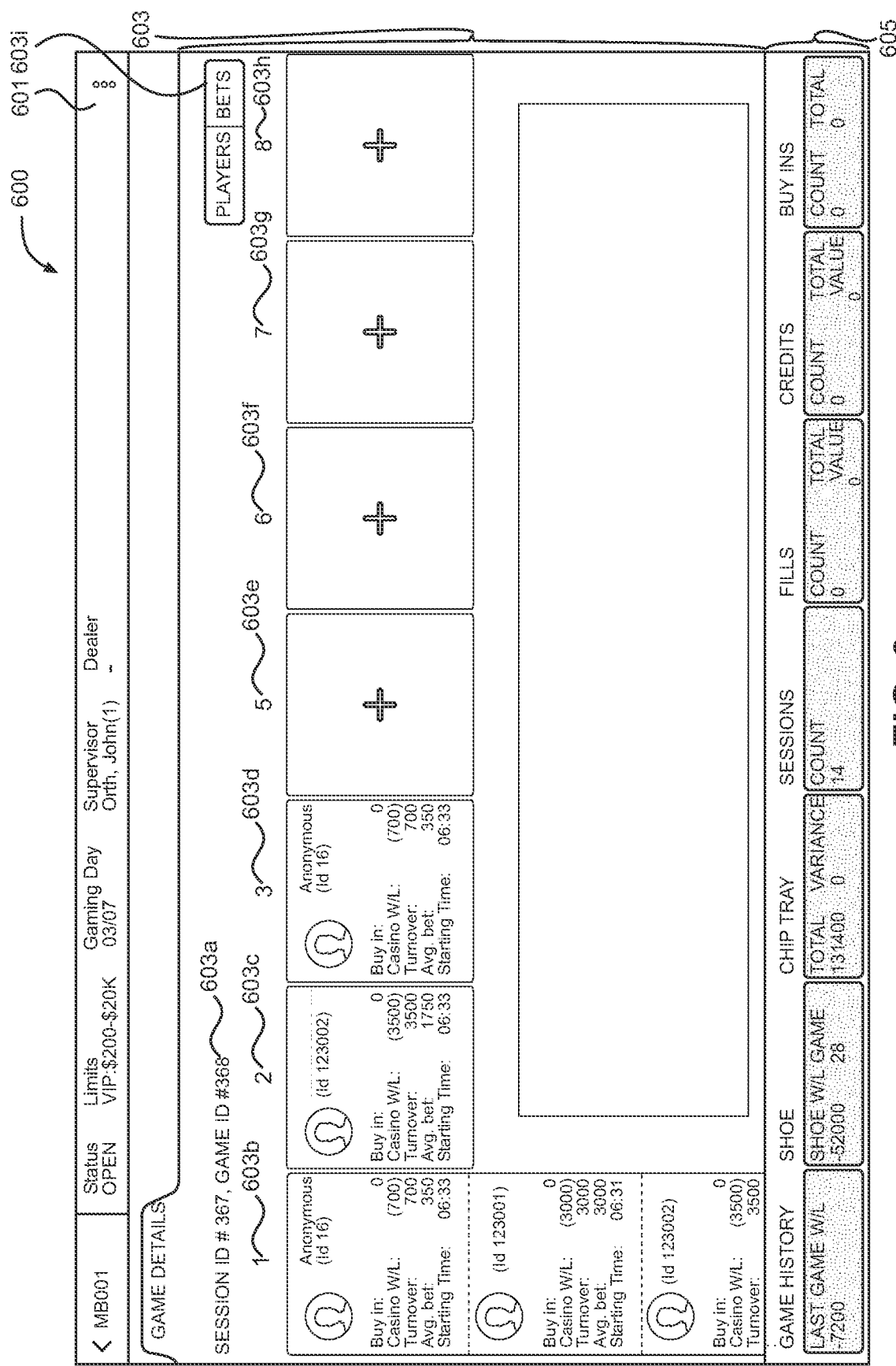
FIG. 6 illustrates an example user interface that may be output to casino personnel, in accordance with some embodiments described herein.

In accordance with some embodiments, a table gaming system provides for a virtual table corresponding to a physical table, wherein the virtual table may include a greater number of wager placement positions than the physical table. In some embodiments, the virtual wager placement positions may be dynamically modified or adjusted for a particular game event as wagers for that game event are received or detected by a game controller. For example, additional virtual wager placement positions may be dynamically generated or added to the virtual table by the game controller as additional wagers are detected on the corresponding physical table or received from remote player devices, such as if remote players place wagers on the particular gaming event or multiple players place distinct wagers on the same wager placement position of the physical table. Such a table gaming system overcomes the inherent physical space limitations of a physical table (i.e., a physical table can only be built so large in order to allow a dealer or players to reach all wager positions, allow for an enjoyable player experience and reasonably fit into a floor plan of a casino) by allowing for additional wagers (whether from remote players or from players physically present at the table who place their wagers on physical wager positions on which other players have already placed wagers) to be clearly and distinctly represented via the virtual table. Examples of such virtual representations are illustrated in FIGS. 5 and 6, respectively.

In accordance with some embodiments, an electronic table system for facilitating a game comprises (i) at least one physical table including a first number of physical wager placement positions, each of the physical wager placement positions corresponding to a respective area of a physical table surface on which a gaming element may be placed in order to indicate a particular wager made by a player (e.g., player wagers on "Player" outcome in a baccarat deal or player places a wager on a hand of blackjack); (ii) a detecting mechanism operable to detect a gaming element being placed on and removed from a particular physical wager placement position of the first number of physical wager placement positions; (iii) a display device; and (iv) a game controller operable to track multiple distinct wagers placed on a single physical wager placement position of the plurality of physical wager placement positions by performing a method. In accordance with some embodiments, the method performed by the game controller includes: (i) identifying a plurality of gaming elements detected in association with a particular physical wager placement position of the first number of physical wager placement positions and for a particular game wagering opportunity (e.g., a particular deal of cards for a Baccarat game instance or a particular hand in a Blackjack game); and (ii) identifying whether the plurality of gaming elements comprise a single wager or a plurality of distinct wagers (e.g., wagers made by different players) placed on the particular physical wager placement position and for the particular game wagering opportunity by: (a) receiving first data indicating a first time of movement of at least one first gaming element recognized by the detecting mechanism in association with the particular physical wager placement position; (b) receiving second data indicating a second time of movement of at least one second gaming element recognized by the detecting mechanism in association with the particular physical wager placement position; (c) determining a time interval between the first time and the second time; and (d) making a first determination that the at least one first gaming element and the at least one second gaming element comprise a single wager if the time interval is less than a maximum time interval, otherwise making a second determination that the at least one first gaming element and the at least one second gaming element comprise two distinct wagers.

In accordance with some embodiments, the first time of movement and the second time of movement may be movements of gaming elements onto the particular physical wager placement position (i.e., a time at which the gaming elements are first recognized, detected or acquired by an RFID antenna or an optical imaging component). Such a recognition, detection or acquisition may occur, for example, during a portion or phase of a game event in which wagers are being accepted (i.e., before betting is closed such that the outcome can be revealed). In accordance with some embodiments, the first time of movement and the second time of movement may be movements of gaming elements off the particular physical wager placement position (e.g., a time at which the gaming elements are recognized or identified as having been removed from the RFID antenna or optical imaging component or as no longer being within a detecting range of the detecting component). Such a recognition or identification of removal or lack of presence may occur, for example, during a portion or phase of the game event in which wagers are no longer being accepted, such as after all cards are dealt and winning/losing wagers determined (e.g., all dealt cards are revealed for the game event, payouts of winning wagers are made and losing wagers are collected). In some embodiments, a detecting component may continuously or essentially continuously monitor a given wager placement position for the presence of gaming elements and thus the specific time of acquisition (when a given gaming element is first detected on the physical wager placement position) or removal (when a given gaming element is first determined to no longer be present on or within range of the detecting component of the physical wager placement position) may be identified. In some embodiments, the polling interval may be set to one or a few milliseconds, to allow for granular and precise time or movement determinations.

Described herein are systems, processes and articles of manufacture which provide for facilitating wagering activity on an electronic or smart table, such as an RFID-enabled table (e.g., wagering activity in a baccarat, blackjack or roulette game). In accordance with some embodiments, systems, processes and articles of manufacture provide for leveraging the RFID-tracking capability of a table, or optical imaging capability of the table, for functions such as (i) tracking, detecting and/or identifying (e.g., in real-time) the placement of multiple distinct wagers (e.g., represented as different stacks of wagering chips), each wager corresponding to a distinct player, within range of a particular detecting component or within a single bet spot or wager placement position; (ii) recognizing or identifying each such wager on a single bet spot as corresponding to a different player; (iii) accurately detecting or identifying when payouts for each distinct wager on the same bet spot have been made, and accurately attributing each distinct payout to the appropriate wager; and/or (iv) creating a virtual bet spot in the memory of the table system each time a distinct wager comprising at least one wagering chip is detected at a bet spot or wager placement position, independent of where on the physical table the wager is detected (e.g., if two independent wagers are detected at the same bet spot, two distinct virtual bet spots will be created in the memory of the smart table, one for each distinct wager). In some embodiments, a table system may be operable to update a graphical user interface (GUI) output to a dealer or other personnel of a casino or other gaming establishment, to indicate or represent each such virtually created bet spot and corresponding wager.

In accordance with some embodiments, a system is provided which includes at least one table having a plurality of RFID detecting component (e.g., an RFID antenna) placed thereon, for use in recognizing the placement of an RFID-enabled wagering chip or other gaming element on one or more wager placement positions of the table or associated with other components or areas of the table (e.g., an RFID-enabled chip tray). In accordance with other embodiments, the system includes (in lieu of or in addition to the RFID detecting component(s)), at least one optical image detecting component for detecting, via optical imaging technology, at least one wagering chip or other gaming element on the one or more wager placement positions of the table or elsewhere on the table (e.g., within a chip tray).

A table system comprising RFID components may be referred to herein as an RFID-enabled table. An RFID-enabled table, as the term is used herein, comprises a table operable to facilitate a game (e.g., a card game such as baccarat or blackjack) and equipped with at least one RFID antenna or other RFID component (described in more detail elsewhere herein). In other embodiments, the table system may be an imaging-enabled table or include other types of technology that serves as the mechanism via which data (e.g., wagering data or other game-related data) is gathered by the table system.

Examples of an RFID-enabled table that may be useful for at least some embodiments described herein are described in (i) U.S. Patent Publication No. 2016/0016071, filed on Sep. 28, 2015 in the name of Walker et al. and entitled RFID SYSTEM FOR FACILITATING SELECTIONS AT A GAME APPARATUS; (ii) U.S. Pat. No. 9,262,885 filed on Jun. 5, 2012 in the name of Moore et al. and entitled METHODS AND SYSTEMS FOR FACILITATING TABLE GAMES, each of which is incorporated by reference herein.

Some examples of other technologies (such as optical imaging technologies) that may be utilized to implement at least some embodiments described are described in the following patents: (i) U.S. Pat. No. 5,782,647 to Fishbine et al.; (ii) U.S. Pat. No. 5,103,081 to Fisher et al; (iii) U.S. Pat. No. 5,548,110 to Storch et al.; and (iv) U.S. Pat. No. 4,814,589 to Storch et al. Each of the foregoing patents are incorporated by reference herein and disclose various systems and methods for encoding information on wagering chips or other gaming elements and for determining information encoded in the color, geometry, size or patterns on a wagering chip in accordance with some embodiments described herein.

A table that is equipped with RFID-enabled technology, optical imaging technology or other technology that allows reading of data from one or more game elements used for games playable on the table is referred to as an electronic table or a smart table herein. For purposes of clarity, the example embodiments described herein will primarily refer to an RFID-enabled table but it should be understood that some embodiments may alternately be implemented using an optical imaging-enabled electronic table that utilizes imaging technology to read data from game elements (e.g., to read bar codes or other codes embedded in or included on one or more wagering chips). The embodiments described herein are not limited to implementations utilizing RFID or optical imaging technology, other technologies may be substituted for detecting the presence (or removal of) a wagering chip(s) on a player position or bet spot, as well as for reading data from the wagering chip(s).

Figure 3:
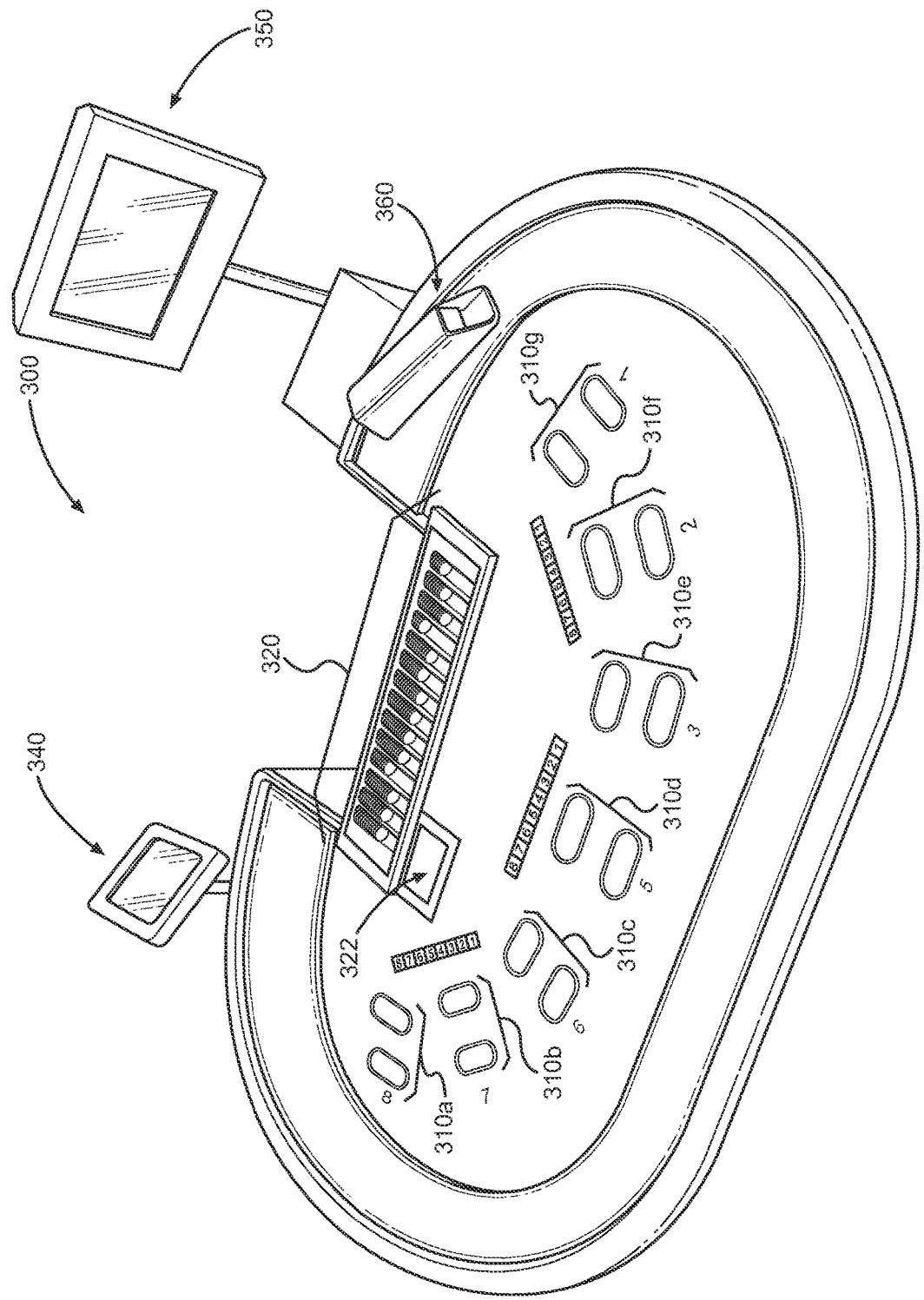
FIG. 3 illustrates a top planar view of a smart table for facilitating a baccarat game, in accordance with some embodiments.

In accordance with some embodiments, a smart table system includes a dealer display (e.g., as illustrated in FIG. 3), which may comprise a display facing the dealer and for outputting information to the dealer. The dealer display may, in some embodiments, be operable to receive data and/or instructions from a processor (e.g., a processor integrated with the dealer display, a processor of CGS 750 (FIG. 7) or another game controller, another processor of the table at which the dealer display is located and/or a remote processor of a server device) and to output information to the dealer based on this data and/or instructions. The data and/or instructions may be based on data read from one or more RFID-enabled chips in the RFID-enabled chip tray of the table or elsewhere on the table. For example, the dealer display may be utilized to show, per physical wager placement position shown on the felt of the table, the number of players and corresponding wager of each player per wager placement position (e.g., as illustrated in the example GUIs of FIG. 5 and FIG. 6).

In accordance with some embodiments, a table system which includes an RFID-enabled chip tray as well as various antennas for reading information from RFID-enabled chips placed on the table may be operable to perform a verification validating the correct payout provided to each player or for each wager placed on a particular wager placement position of the table. In some embodiments, a decremented payout method as described with respect to FIGS. 4A-4E may be utilized to track each of a plurality of wagers placed on a single bet spot, associate each wager with a particular player identifier, stack or stack identifier or bankroll identifier and verify that the correct payout amount has been provided by the dealer.

Various systems and several examples are provided herein. The present disclosure will focus on baccarat as an example, but it should be appreciated that similar functionality may be applied to other RFID-enabled table games such as blackjack, roulette, craps, Sic Bo, Pai Gow (tile and poker variations), LET IT RIDE™, CARIBBEAN STUD™, 3-CARD POKER, 4-CARD POKER, SPANISH 21, variants of such games (e.g., Chemin de Fer), and the like.

Referring now to FIG. 1, illustrated therein is a system 100 which may be useful in implementing at least some embodiments described herein. The system 100 may comprise, for example, a system within a particular gaming establishment which includes a plurality of smart tables for facilitating card games. In accordance with at least some embodiments, the system 100 includes a table game server 110 (e.g., for managing chip, player and/or game activities at one or more connected smart tables, providing data for a particular player placing a wager at a table from a global player database, etc.) that is in communication, via a communications network 130, with one or more table systems 120. The table game server 110 may communicate with the table systems 120 directly or indirectly, via a wired or wireless medium such as the Internet, LAN, WAN or Ethernet, Token Ring, or via any appropriate communications means or combination of communications means. Each of the table systems 120 may comprise computers, such as those based on the INTEL® PENTIUM® processor, that are adapted to communicate with the table game server 110. Any number and type of table systems 120 may be in communication with the table game server 110, although only three (3) are illustrated in the example of FIG. 1.

Communication between the table systems 120 and the table game server 110, and (in some embodiments) among the table systems 120, may be direct or indirect, such as over the Internet through a Web site maintained by table game server 110 on a remote server or over an on-line data network including commercial on-line service providers, bulletin board systems and the like. In yet other embodiments, the table systems 120 may communicate with one another and/or table game server 110 over RF, cable TV, satellite links and the like.

Some, but not all, possible communication networks that may comprise network 130 or otherwise be part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, the table game server 110 may not be necessary and/or preferred. For example, at least some embodiments described herein may be practiced on a stand-alone table system 120 and/or a table system 120 in communication only with one or more other table systems 120 or a dedicated server device. In such an embodiment, any functions described as performed by the table game server 110 or data described as stored on the table game server 110 may instead be performed by or stored on one or more table systems 120.

Figure 2:
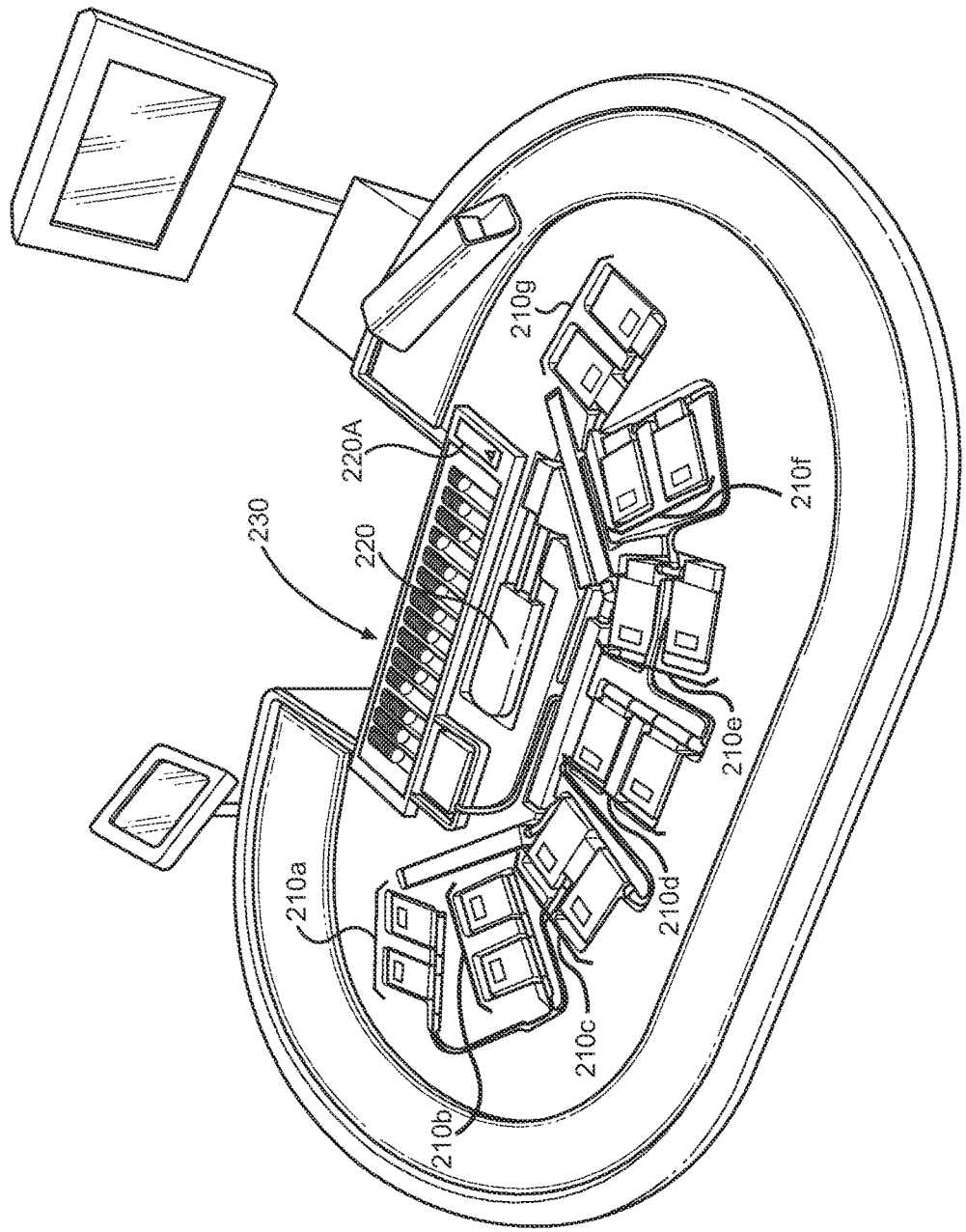
FIG. 2 illustrates a diagram of an RFID antenna layout on a smart table for facilitating a baccarat game, in accordance with some embodiments.

Referring now to FIG. 2, illustrated therein is one embodiment of how a plurality of antennas may be placed on a table (which may be one embodiment of table system 120 of FIG. 1), in a manner that facilitates some of the embodiments described herein. The table illustrated in FIG. 2 includes seven (7) distinct player positions arranged in a semi-circular configuration. Placed at each respective player position is a set of two antennas 210a-210g, one for each bet spot or wager placement position available at each respective player position. For example, one antenna at a respective wager placement position at a particular player station (e.g., area of a physical table in front of a particular player seat) may be for recognizing a bet on Banker (e.g., recognizing RFID-enabled chips placed on the Banker bet spot) and the other antenna may be for recognizing a bet on Player (e.g., recognizing RFID-enabled chips placed on the Player bet spot). Thus, if a player were to place a wager (e.g., one or more RFID-enabled chips, a stack of chips) on a bet spot associated with one of the antennas at the wager placement position associated with the set of antennas 210a, the appropriate antenna (Banker bet antenna or Player bet antenna) would recognize such placement (i.e., the antenna nearest to which the chips are placed would "acquire" the chip(s) comprising the wager).

In some embodiments, only one (1) antenna or other detecting component may be associated with each wager placement position (e.g., each player position may comprise a single bet spot and have associated therewith a single antenna). In some embodiments, more than one player may place a wager on a particular wager placement position and thus more than one distinct wager may be identified based on a detection of wagering chips near a single antenna or determined by the table system and more than one distinct player may be associated with the bet spot for a given hand or other game event. As described further with respect to FIGS. 4A-4E, 5 and 6, in some embodiments a table system operating in accordance with embodiments described herein may create a virtual bet spot in its memory (and, in some embodiments) output or modify a GUI to illustrate each virtual bet spot and information corresponding to the wager placed on that bet spot (e.g., amount, information associated with the player who is associated with the wager, etc.). Thus, even though only seven (7) bet spots may be available on the physical table and a single antenna associated with each bet spot, in some embodiments a plurality of players or a plurality of wagers (e.g., a plurality of stacks of wagering chips) may be placed on at least one of the bet spots such that more than seven (7) players may participate in a given hand or other game event and the smart table may be able to accurately detect, track and manage each individual wager, payout made for each wager and/or fee collected for each individual wager. For example, a decremented payout such as that described with respect to FIGS. 4A-4E may be used to identify, by the table system, the individual multiple wagers placed on a single bet spot associated with a single antenna. In some embodiments, the table system may further be operable to identify the player associated with each wager and output to the dealer information associated with that player (e.g., as described with respect to FIGS. 5 and 6 and elsewhere herein).

In some embodiments (not shown in FIG. 2), a table system 120 may include at least one shared or common wager placement positions or bet spots in addition to the player position bet spots discussed above, each such shared or common bet spot associated with a distinct antenna. For example, in one embodiment particular types of additional bets may be made available via shared or common bet positions and each such bet spot may include its own antenna: one antenna may be placed at a Player Pair bet spot, another antenna may be placed at a Banker Pair bet spot, and two antennas may each be placed at a Tie bet spot. Applicant has recognized that in some cases, it may be beneficial to provide for common or "shared" betting areas for placement of Player bets or Banker bets in a baccarat game. That is, rather than associating or providing a plurality of physical betting areas for each individual player seated at the gaming table, it may be beneficial to instead offer one or more common betting areas (each associated with a given wager type), accessible to multiple players. Each such common or shared bet spot may have associated therewith its own antenna.

In some embodiments, player wagers placed upon such shared betting areas of the gaming table (whether they be the player position 1-7 betting spots or additional special common bet spots) may be identified and/or associated with respective player(s) having placed such wagers via one or more RFID antennas incorporated into the layout of the table itself.

In one embodiment, a player desiring to place a wager on a common bet spot may indicate his interest in doing so (e.g. audibly, via a hand signal) to the dealer. Thereafter, the dealer may place physical chips representing the player's wager on a first dedicated area of the gaming table associated with the player (e.g., a player position of the table at which the player is sitting), the first dedicated area being associated with a particular RFID antenna. The RFID antenna may then transmit an indication of the wager amount and associated player (or player position) to a processor (e.g., a processor of the table system), which then stores data associated with the wager. Thereafter, the dealer (and/or player) may move the chips representing the player's wager to a second "shared" area of the gaming table, which may be associated with a second RFID antenna. Upon resolution of a game instance associated with the wager (e.g. upon completion of a hand of baccarat), an outcome associated with the wager is determined (e.g. win/loss) along with any corresponding payout that may be due to the player. If the player is entitled to a payout, the dealer may then place wagering chips representing such payout on the second dedicated area of the table. The payout is recorded by the table computer via the second RFID antenna. The original wager and payout may then be placed on the first dedicated area (associated with the first RFID antenna), serving to thereby record an indication of the payout having been provided to the associated player. FIGS. 4A-4E illustrate an alternate, "decremented payout" method of a dealer providing payouts for multiple wagers placed on a given bet spot.

The table illustrated in FIG. 2 further comprises a dealer area at which is positioned an antenna 220. The dealer area antenna 220 may facilitate, for example, calculations and verifications of stack totals for table fills, credits, buy-ins and color-ups (e.g. by reading and providing data regarding one or more chips acquired by the dealer area antenna 220).

In some embodiments, a smart table such as that illustrated in FIG. 2 may include an RFID-enabled chip tray 230 within which is placed at least one antenna 220A. In one embodiment, the chip tray antenna(s) 220A may interact with the dealer area antenna 220 (or a processor which receives data from both the chip tray antenna(s) 220A and the dealer area antenna 220 may take into account the data of the antenna(s) 220A along with the data of the antenna 220) to ensure that wagering chips implicated in certain transactions (e.g., wagering chips included in a Fill transactions) are actually recognized as having been placed into the chip tray after being counted and confirmed on the dealer antenna.

The antennas incorporated into a table such as the table illustrated in FIG. 2 may be placed within an insert under the felt or other covering of the table. Each antenna may have a predetermined range within which it recognizes, determines, identifies or acquires a chip. Thus, if one or more chips comprising a wager is placed within the acquire range of a particular antenna, it may be inferred or determined that a player (e.g., the player who is associated with the acquired chip(s)) is placing a bet on the bet spot associated with the antenna.

It should be noted that the number and placement of antennas illustrated in FIG. 2 is exemplary only and should not be construed in a limiting manner. For example, more than two antennas may be associated with a given player position. In some embodiments, a first antenna or first set of antennas associated with a given player position is associated with a first player (e.g., the primary player playing at that position) while a second antenna or second set of antennas associated with a given player position is associated with a second player (e.g., a remote player or back betting player). In other embodiments, as already described above, a single antenna may be associated with a single player position or even a single wager placement position at a player position. In some embodiments, each antenna of a table may be uniquely identified or identifiable, such that if data or information is received from a particular antenna, that data or communication may comprise a unique identifier of the antenna that allows for a determination or identification of the bet spot and wager placement position associated with that data or communication.

An antenna such as any of those illustrated with respect to FIG. 2 may determine, read, receive, obtain, recognize or determine various information or data from or about an RFID-enabled chip placed within a predetermined range of the antenna. The following are examples or some of the information or data that may be so determined: (i) a unique chip identifier, which uniquely identifies the chip (and which may be utilized to determine additional information associated with the chip, such as a bankroll identifier or a player identifier associated with the chip identifier in a database); (ii) a currency of the chip; (iii) a denomination of the chip (which may be its monetary value; in the case of a token it may comprise the token type); (iv) a chip set identifier, which differentiates types of chips or represents a category of a chip (e.g., cash vs. non-negotiable, promotional, differentiating tokens from monetary chips, chip validity); (v) a casino identifier that uniquely identifies a casino or other registered gaming corporation associated with the chip (this information may also be used to determine chip validity); and (vi) a site identifier that uniquely identifies the physical casino site for which the chip is valid. It should be noted that not all of the above information is necessary or desirable for all embodiments. It should further be noted that any or all of the above-listed information may be stored in a memory of a given chip and transmitted to an antenna via a signal from the chip.

An RFID-enabled chip which may be used in at least some embodiments may include (i) an RFID tag or memory, (ii) an electronic circuit or processor and (iii) an antenna. An RFID-enabled chip usable in at least some embodiments may be similar or identical to those disclosed in U.S. Pat. Nos. 5,166,502; 5,676,376; 6,021,949; and 6,296,190, and U.S. Patent Application Publication Nos. 2004/0207156 and 2004/0219982 which are all incorporated by reference in their entireties. No particular type of RFID-enabled chip is required for the embodiments described herein, so long as the chip can support the functionality described with respect thereto. In some embodiments, each chip may store in its memory (and communicate to an antenna of a table as described herein) a unique serial number, a chip set identifier, an associated player identifier or other information. The gaming establishment (e.g., casino) or other entity may associate values, categories, denominations or other values with each serial number. The association may be in a look-up table or the like. Alternatively, the unique identifier of a given chip may be encoded to include information therein. Likewise, a chip may be color-coded or include other indicia that indicates a value or other information to the player or dealer. In some embodiments, other types of gaming elements such as plaques may be used instead of chips (e.g., for exceedingly large denominations).

In some embodiments, an RFID-enabled chip may be an active chip which includes its own battery or power source. In other embodiments, an RFID-enabled chip may be a passive chip which does not include its own power source. In one embodiment, an electronic circuit and antenna of a given chip may act as a transponder capable of responding to an antenna of the table (e.g., an antenna of an RFID-enabled chip tray of the table). The antenna may be a sensor or other detecting component operable to detect, recognize, determine, identify or sense the presence (or absence) of an RFID-enabled chip, a wagering chip having optically detectable indicia or data encoded thereon or another type of gaming element. The antenna or other detecting component may also be operable to detect, determine, identify, recognize or receive various information about a chip (e.g., chip identifier, chip set identifier, chip denomination, chip status, etc.). The antenna, imaging device or other detecting component of a table or chip tray may also be operable to transmit information to one or more processors or memories of a game controller or other computing device (e.g., information regarding the presence or absence of a chip in a certain location, an identifier of a chip, etc.). Such one or more processors or memories may be components of (i) a table, (ii) a component of a table (e.g., of a dealer display or chip tray) and/or (iii) a server device operable to communicate with one or more tables.

In accordance with some embodiments, an antenna of a table (e.g., an antenna of the set of antennas 210*a* and/or an antenna 220A of a chip tray) may send out an electromagnetic signal that impinges upon the antenna of an RFID-enabled chip, exciting a current within electronic circuit of the chip. In response to the excited current, the electronic circuit of the chip may cause the antenna of the chip to emit a second electromagnetic signal as a response, which is received by the antenna of the table which had sent out the electromagnetic signal. The second signal may comprise identifying information about the chip such that the antenna can identify the chip on receipt of the second signal. The second signal may be generated passively or actively. That is, in a first embodiment, the energy from the interrogation signal provides sufficient power for the electronic circuit of the chip to use to send the second signal. In a second embodiment, the electronic circuit of the chip may include a battery or other power source, which is used to power the generation of the second signal.

In accordance with some embodiments, an antenna or other detecting mechanism of a table (e.g., an antenna or other detecting mechanism of a physical wager placement position that is operable to detect the presence (or lack thereof) of a gaming element on the physical wager placement position) may also be operable to transmit information to one or more processors or memories (e.g., information regarding the presence, absence or movement of a chip in a certain location, an identifier and/or denomination of a chip, etc.). Such one or more processors or memories may be components of (i) a table system, (ii) a component of a table system (e.g., of a dealer display or chip tray) and/or (iii) a server device operable to communicate with one or more table systems. In accordance with some embodiments (e.g., when referring to a processor of a smart table), such one or more processors and memories may be referred to as a "game controller" or Core Gaming System (CGS). As described in more detail elsewhere herein, a game controller or CGS may be operable to perform certain functions with respect to a smart table, such as (i) controlling the polling (e.g., reading or requesting data from) one or more RFID antennas or other detecting components of the table system;

(ii) analyzing or interpreting such data to determine wagering activity at the physical table; (iii) processing such data to determine actions, outputs or signals that should be undertaken based on such data and/or (iv) storing chip placement information (e.g., information about RFID-enabled wagering chips placed on physical wager placement positions of the table, such as the identifiers and/or denominations of wagering chips and which wager placement positions they have been placed on or removed from). A game controller or CGS may comprise specialized hardware, software or a combination of hardware and software, operable to perform at least some of the functionalities described herein.

In one embodiment, a CGS may poll one or more antennas or other detecting components of a smart table (e.g., in accordance with a schedule or program and/or in response to events in a hand being played on the table) in order to obtain or receive data therefrom. Thus, in some embodiments, the CGS may received data from one or more RFID antennas upon polling the antenna and requesting such data (in other embodiments an RFID antenna may more proactively transmit data to the CGS or another processor independent polling functionality). In accordance with some embodiments the CGS may determine, based on the data received from one or more RFID antennas, (i) information that should be output on a dealer display and/or one or more dealer displays, (ii) a payout that should be made to a player; (iii) a commission that should be collected by a dealer; (iii) whether an additional wager may be accepted based on a status of a game event; (iv) whether a gaming element detected at a wager placement position is part of an existing wager previously stored/recognized for that wager placement position for a current game event (e.g., is the gaming element being added to an existing stack and part of the previously identified wager?) or whether the newly detected gaming element should be considered a new and distinct wager being placed on that wager placement position for the current game event; and (iv) whether a previous determination of whether two distinct gaming elements are part of the same wager or part of distinct wagers should be confirmed or modified based on newly acquired movement data (e.g., based on the respective times at which the two distinct gaming elements were determined to have been removed from the wager placement position).

Referring now to FIG. 3, illustrated therein is a planar view of a smart table 300, which may be operable to facilitate one or more embodiments described herein. The table 300 may comprise the table of FIG. 2, but with a felt or other covering hiding the antennas placed underneath. In many respects, the smart table 300 may appear to a player as a regular baccarat table, with the RFID capabilities of the table not being readily discernable. The table 300 is configured for a baccarat game but the embodiments described herein are not limited to baccarat and a similar table may be provided with a top layout appropriate for facilitating another game (e.g., blackjack).

The rules of baccarat are well understood, but the interested reader is directed to www.wizardofodds.com/baccarat for a more detailed explanation. Table 300 comprises a smart table configured to facilitate a baccarat game and includes a dealer area within which is located a dealer display 322 and an RFID-enabled chip tray 320. The dealer display may be utilized to output data or prompts to a dealer during the course of game play (e.g., a commission amount to be collected from one or more players, a payout to be provided to one or more players, an amount in lost wagers to be collected from one or more players, an alert regarding one or more missing chips which is to be rectified by the dealer, etc.).

The table 300 further includes seven (7) player positions 310a-310g, each player position including a Banker bet spot and a Player bet spot. In some embodiments, each player position may comprise a single bet spot (e.g., in a Blackjack or other type of card game). Of course, any number of player positions may be utilized. Further, in some embodiments the table may include bet spots in addition to bet spots at player positions, such as shared or common bet spots.

The table 300 further includes a display 340 which a dealer or other gaming establishment personnel may utilize to access information regarding game events, transactions and other data related to the table 300. In one embodiment, the display 340 may be utilized to display wager status on all bet positions or wager placement positions, including any virtual bet positions or plurality of distinct wagers placed on a given bet position, to a dealer. For example, a software application having user interfaces and information such as that illustrated in FIGS. 5 and/or 6 may be accessible via the display 340.

The table 300 further includes another display 350 which faces the players and may show data to players such as recent historical outcomes (sometimes referred to as a "trend board"). Players sometimes use such historical outcomes in an effort to predict trends within a series of game instances. In some embodiments, the display 350 may output a virtual representation of the table and/or wager status on all wager placement positions, including any virtual bets placed by remote players.

The table 300 further includes an electronic card shoe 360 via which cards for the game are dealt and, in some embodiments, shuffled (in other embodiments cards are shuffled outside the shoe or pre-shuffled cards are used within the shoe). In accordance with some embodiments, the electronic card shoe 360 may communicate with a processor (e.g., a processor of the table 300, such as a process of a game controller component of the table 300) to communicate data regarding cards dealt and/or remaining in the shoe.

The table 300 may include additional components (at least some of which may not be easily visible to a player or other observer) such as one or more processors, a memory storing a general program and one or more specialized software applications which, in combination with data obtained from the RFID antennas located on the table, may facilitate many of the functions described herein (e.g., tracking wagering activity and game outcomes, tracking distinct payouts made for respective wagers placed on a single bet spot, tracking expected and actual inventory of a dealer's chip tray, calculating payouts due to players and losses incurred by players to aid dealers in providing accurate payouts and collecting accurate losses and commissions, calculating dynamic odds, dynamically determining information about possible re-characterization bets, etc.).

Referring now to FIGS. 4A-4E, illustrated therein are example illustrations of how a particular method of tracking, verifying and/or managing multiple distinct wagers at a particular bet spot may be implemented at a table system, in accordance with some embodiments. The method illustrated in FIGS. 4A-4E may be useful, for example, in situations in which it is not clear to the table system whether there are multiple distinct wagers at a given physical bet spot. It may also be useful in other situations in which verifications of the individual distinct wagers on a given bet spot is desired.

As described herein, in accordance with some embodiments, a table system as described herein may generate a virtual bet spot independent of table layout location any time an associated RFID gaming chip (or stack of such chips) is placed on a table or a bet spot of a table that has an antenna associated therewith. In accordance with some embodiments, a detected RFID gaming chip may be encoded with a unique serial number as well other data such as at least one of (i) the chip's denomination; (ii) a chip set identifier of the chip; (iii) a casino name and manufacturer; and (iv) additional data that may be utilized by the system. In accordance with some embodiments, a game controller of a table system, upon determining certain data of a wagering chip that is detected on a table, may assume or determine a wager placement position and/or generate a virtual wager placement position for the chip (or stack of wagering chips, as the case may be), generated for the purpose of tracking the player's wagers (or tracking the distinct wager, if a player is playing anonymously or if the player is not identified), regardless of chip position or placement on the physical layout of the table. As described herein a virtual representation of a table may have many more virtual wager placement positions than there are physical wager placement positions on the physical table to which the virtual representation of the table corresponds (e.g., as illustrated in FIG. 5, multiple virtual bet spots may be associated with a given physical bet spot of a table; it should be noted that although three virtual bet spots are illustrated for each physical bet spot in FIG. 5, any number of virtual bet spots may be utilized).

In accordance with some embodiments, the table system may further be operable to identify the particular player associated with a detected wagering chip (or stack of wagering chips) based on data corresponding to the chip (e.g., based on data read directly from the chip or based on data retrieved based on an identifier read from the chip). For example, the table system may be able to determine (based on data store in a local memory or data stored in a remote server with which the processor of the table system is operable to communicate) the player identifier associated with the unique chip identifier and/or bankroll identifier read from the chip or otherwise determined based on data read from the chip. In another example, the table system may be able to associate a particular player with the detected wagering chip(s) based on a last known player position or player identifier associated with the chip. In embodiments in which the table system is able to determine a unique player identifier associated with a wagering chip (or stack of wagering chips) detected at the physical table, the table system may be able to distinguish distinct wagers placed on a given wager placement position. For example, the table system may be programmed to assume that all wagering chips associated with the same player identifier correspond to the same better and same wager while wagering chips associated with different player identifiers correspond to different and distinct bettors/wagers. In some embodiments or situations, however, the table system may not be operable (or able, for a given hand or game event, due to poor signal strength or another reason) to identify or determine a player identifier associated with a given wagering chip or stack of wagering chips and thus may not be able to accurately or with reasonable certainty determine whether there are multiple distinct wagers being placed on a given bet spot. For example, signal failure or error conditions in the system may occur due to damaged or defective chips, antenna failure or environmental interference.

In some embodiments in which multiple distinct wagers are detected for a given antenna or other detecting mechanism or for a given physical bet spot of a table, the number of distinct wagers may be unclear to the system. Similarly, in some circumstances in which multiple distinct wagers are allowable on a given physical bet spot, it may be unclear to the system whether there are multiple distinct wagers on a given physical bet spot or not. Accordingly, Applicant provides herein an example method for verifying during the payout stage of a hand or other game event (when payouts are provided and payments collected based on results of a hand or other game event, such as after all cards for the game event are dealt and revealed). This example method is referred to herein as a "decremented payout method" and may be used to clarify the distinct wagers and/or individual bettors on a given physical bet spot. In the decremented payout method, each time the dealer pays a specific wager among several that have been placed on the same wager placement position and thus acquired or detected by the associated antenna, the wager and the related payout chips are simultaneously removed from the wager placement position and thus no longer detected by the associated antenna. The action of simultaneously clearing the antenna (i.e., removing chips out of detecting range of the antenna) with the underlying wager and related payout chips identifies that the wager is a distinct wager and/or corresponds to a single bettor. Subsequent payout chips are added to and then removed from the same wager placement position and thus antenna with the underlying wagering chips until each distinct bet is identified and paid and all bets are paid.

Figure 4A:
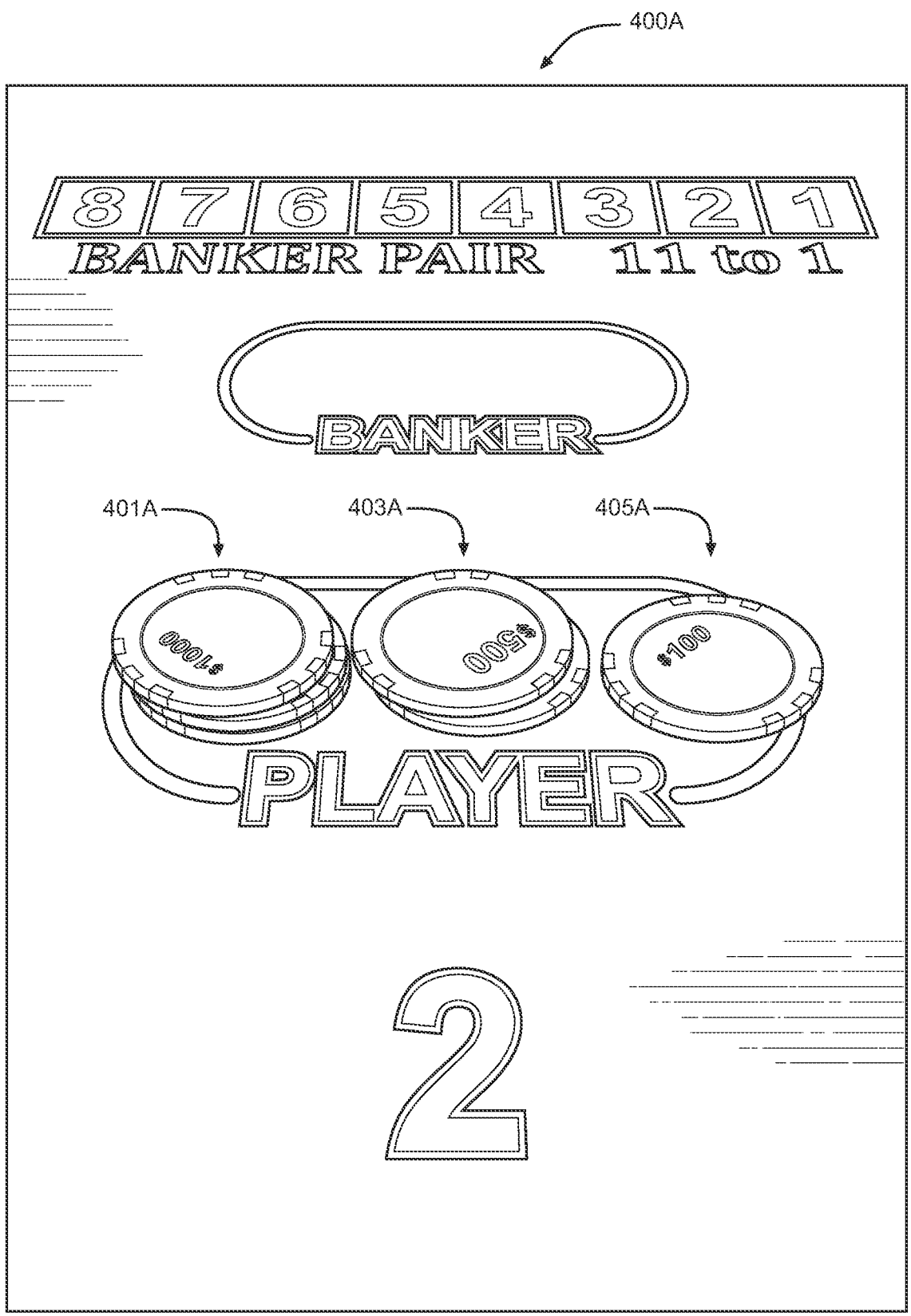
FIGS. 4A-4E illustrate a progression of a payout process at the end of a hand or round of a card game, for multiple wagers placed on a shared betting area, in accordance with some embodiments described herein.
Figure 9:
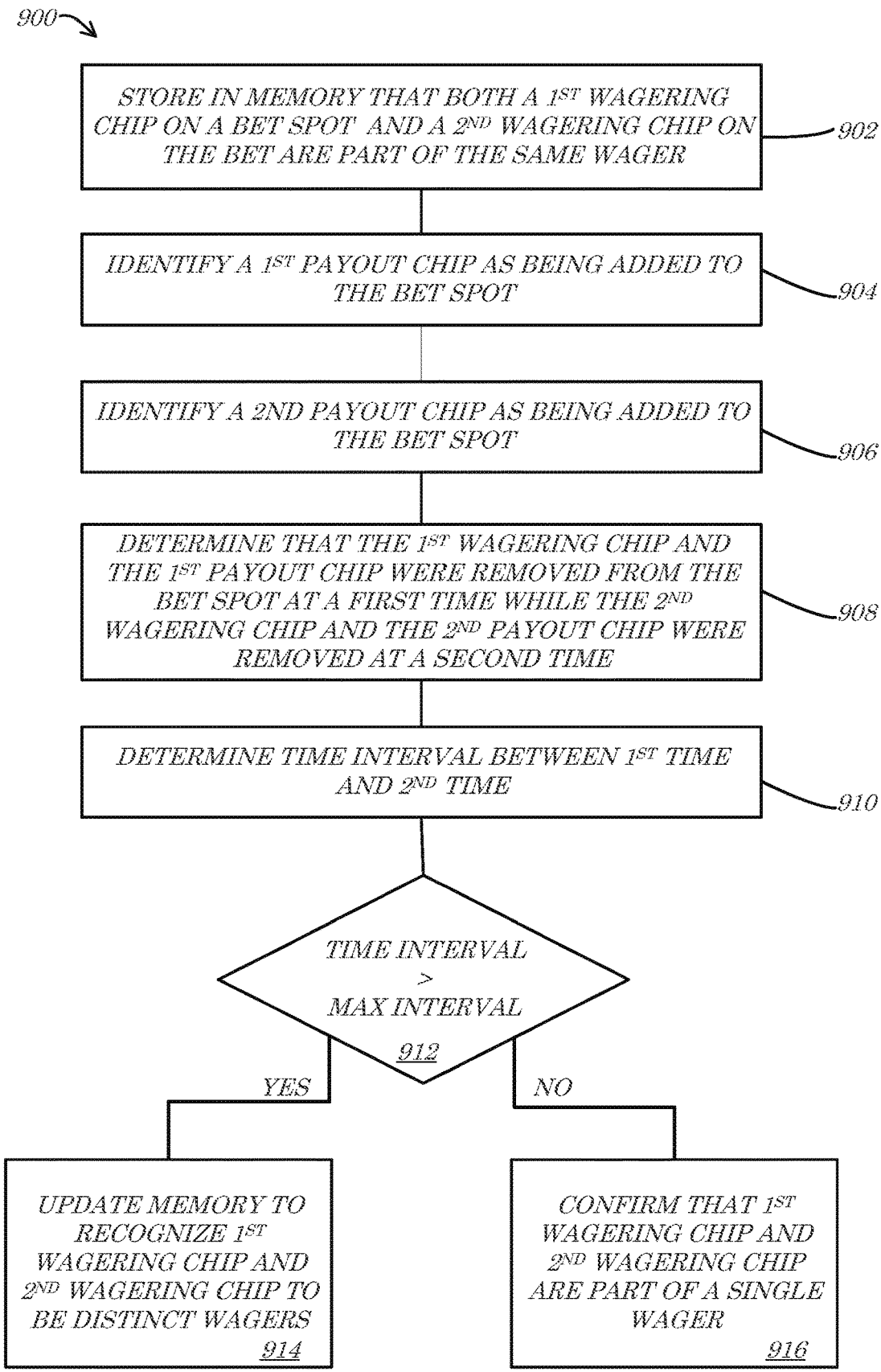
FIG. 9 illustrates a flowchart of an example process consistent with one or more embodiments described herein.

Referring now to FIG. 4A, the screen 400A illustrates a magnified view of multiple distinct wagers placed on a given wager placement position at a given player position (player position 2, such as that illustrated in element 310*f* of table 300 in FIG. 3). The screen 400A illustrates that there are three (3) distinct wagers at player position 2, all three (3) are placed on the Player bet spot. One distinct wager is represented as a stack of three (3) chips and labeled as wager 401A. A second distinct wager is represented by a stack of two (2) chips labeled as wager 403A. A third distinct wager is represented by a single chip and labeled as wager 405A. It should be noted that, in some embodiments, the table system may not initially be able to determine or confidently identify whether all the wagering chips placed on the Player bet spot of player position 2 comprise a single wager or multiple wagers. FIGS. 4A-4E, as well as FIG. 9, illustrate respective example methods that may be implemented in order for a game controller to be able to determine and/or confirm whether a plurality of game elements (e.g., wagering chips) identified at a particular bet spot or physical wager placement position of a physical table comprise a single wager or multiple distinct wagers.

In one embodiment, the first bettor who places the first distinct wager at a physical bet spot of a table may be a player seated at the table (e.g., in the example of FIG. 4A, the wager 401*a* may correspond to a player physically seated at player position 2 of the table, assuming the distinct wagers are placed left-to-right). Any additional bets (e.g., the second two bets 403*a* and 405*a* in FIG. 4A) may, in some embodiments, be referred to as "back bets" and may be bets from players standing behind the seated player and reaching from behind to place the bet on the table or remote bettors who are betting on the game from remote locations (e.g., from more than five (5) feet away from the table, such as from their hotel room, another room in the gaming establishment, their home or another location outside the gaming establishment). In some embodiments "back bets" may be placed by remote players who place bets via computing devices from locations remote from the table and who have representatives (e.g., casino personnel or other designees) who physically place chips on the table on their behalf. In some embodiments, the wagers of such remote players may not even be physically represented on a table using physical wagering chips, but may instead only be virtually represented on a display of the table while on other embodiments the wagers of remote or back bettors may be physically represented on a physical table (e.g., by having a dealer place wagering chips or other gaming elements representing such wagers). Back bettors may also be referred to as standing players or over-the-shoulder bettors (in the case of players who are physically near the table and are standing behind the seated player) or remote players (in the case of players who are placing bets using a computing device and are not physically near the table; the term "near" may, in some embodiments, refer to a proximity of five (5)-ten (10) feet or closer). In accordance with some embodiments, a table system operating as described herein may use the timing of chip acquisition at an antenna of a table to estimate the presence of different stacks that are assumed to represent different distinct bets and bettors. For example, if an aggregation of chips (a stack) is identified simultaneously as the position antenna is scanned (i.e., all the chips of a plurality of chips are first detected or acquired essentially simultaneously, then the presence of a discrete stack and first distinct wager may be assumed. Essentially simultaneously may, in some embodiments, refer to less than one (1) second apart or within a predetermined number of polling instances (e.g., within three (3) or fewer polling instances, depending on how far apart the polling instances are spaced). If another stack of chips (i.e., at least one wagering chip) is then subsequently identified the next time the wager placement position (or a detecting component corresponding thereto) is scanned or polled, this newly detected stack may be assumed by the system to represent a second distinct wager.

It may be that the table system on which these three (3) distinct wagers have been placed has not been able to clearly identify or verify that there are indeed three (3) distinct wagers placed on a single bet spot. Or it may be that it is desired to verify that there are the three (3) distinct wagers, which have been identified by the table system (e.g., based on associating different player identifiers with the different chips recognized at the same bet spot, based on different timing of when different chips were detected at the same bet spot, or otherwise). In some embodiments, such a verification or confirmation of wager assumptions or inferences (e.g., whether a plurality of wagering chips or other gaming elements detected at a particular wager placement position for a particular game event are part of a single wager or comprise multiple distinct wagers) may, in some embodiments, be performed during the portion of a card game when payouts are resolved (i.e., as part of the payout and wager collection process).

FIGS. 4B-4E illustrate how a method referred to as a "decremented payout method" may be utilized to determine or verify whether multiple wagering chips detected on a particular wager placement position for a particular game event are all part of a single wager or multiple distinct wagers. In the particular example being illustrated in FIGS. 4B-4E, the decremented payout method is utilized to verify that there are the three (3) distinct wagers that were placed on the Player bet spot of player position 2. As described herein, the decremented payout method comprises paying out the winnings (or collecting any fees, commissions or other payments) for each distinct wager one at a time, and clearing that wager along with the payout provided therefore essentially simultaneously, such that one wager is cleared off the bet spot at a time. In other words, in the embodiments of FIGS. 4B-4C, losing wagers are collected by the dealer one at a time, such that all wagering chips comprising the losing wager are removed from the bet spot at the same time and not at a time when other wagers are being cleared off the bet spot, and winning wagers are paid out such that the wagering chips and payout chips comprising the winning wager are removed from the bet spot at the same time and separately from the clearing of other wagers from the bet spot.

Figure 4B:
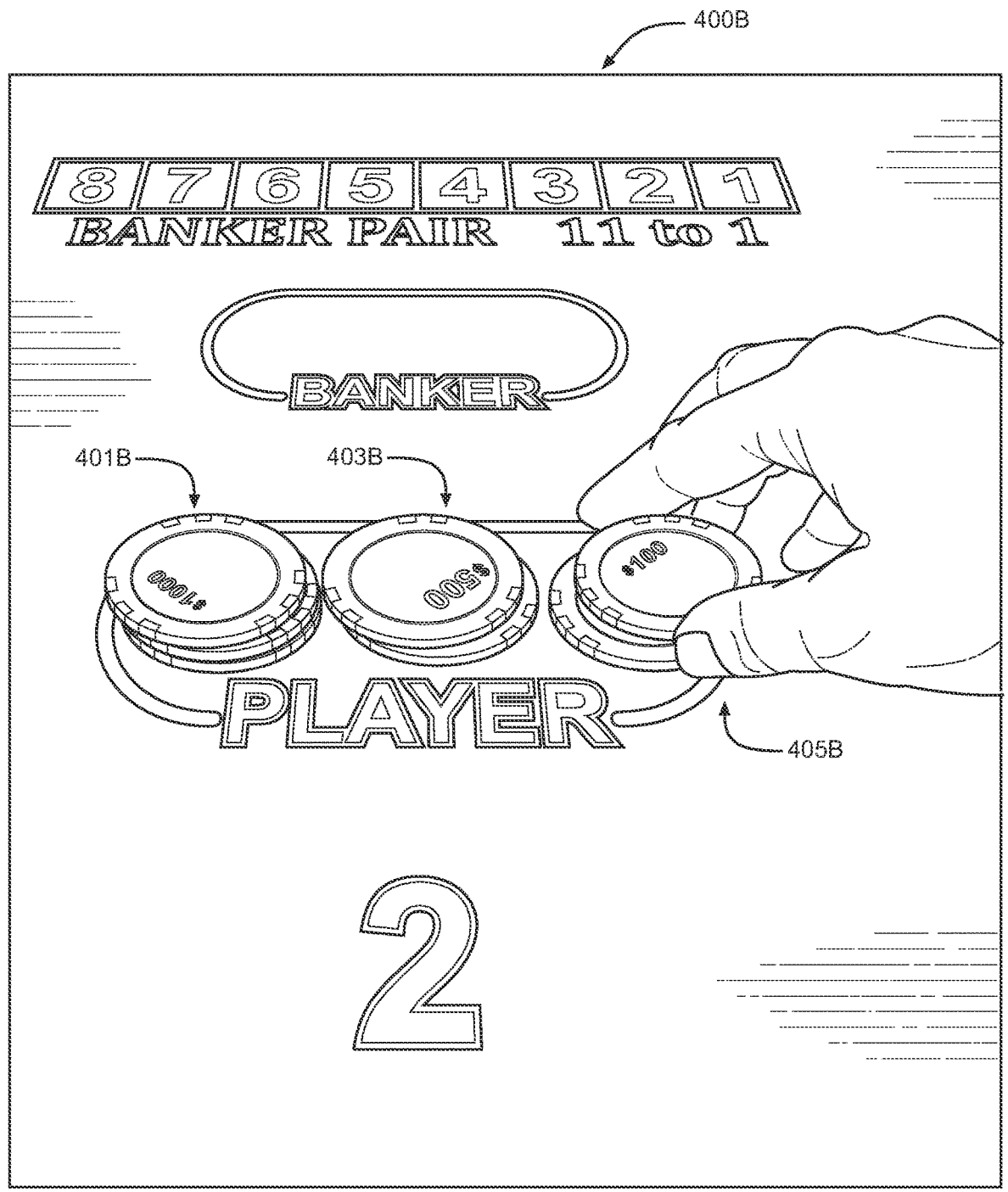
Figure 4C:
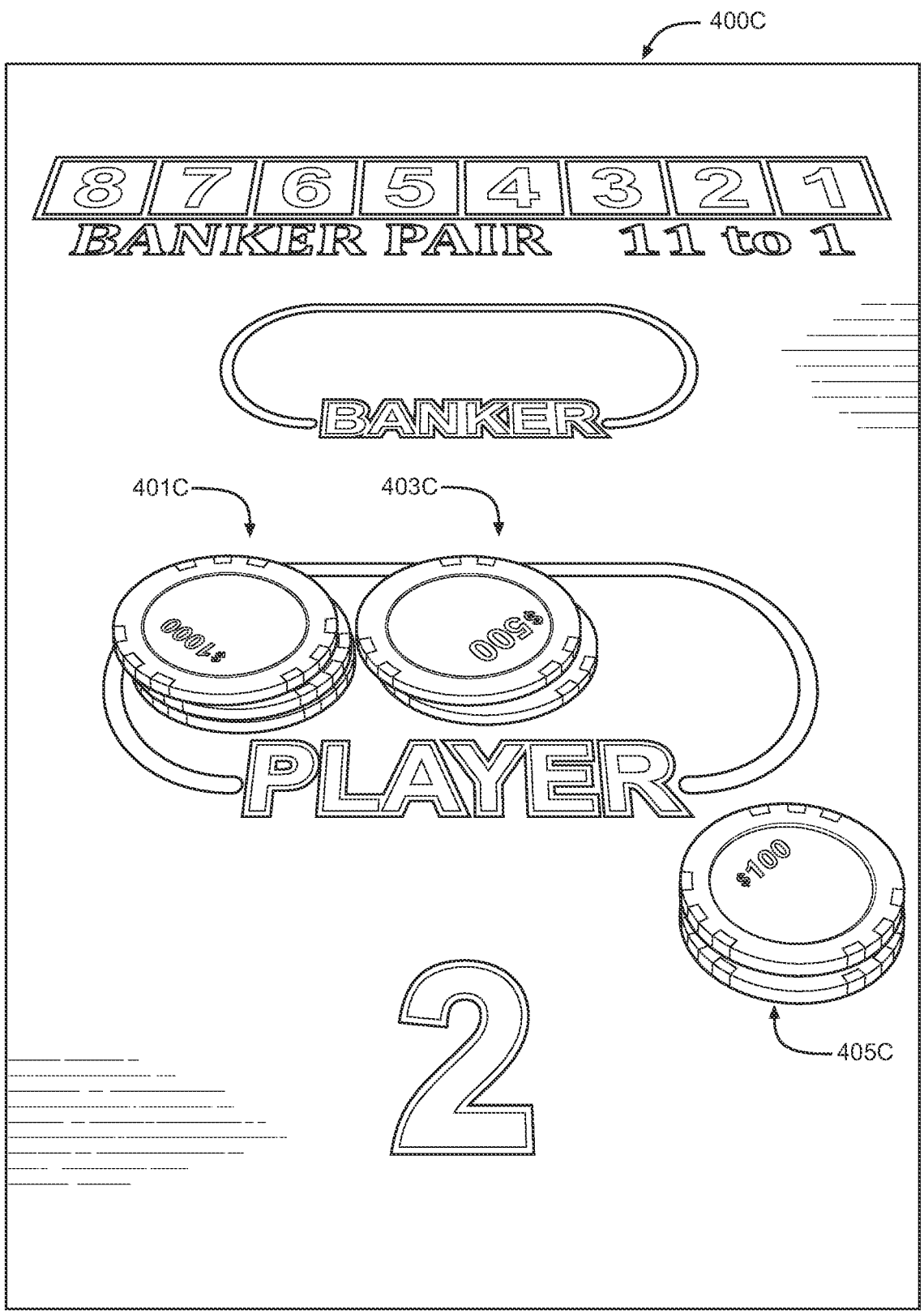
Figure 4D:
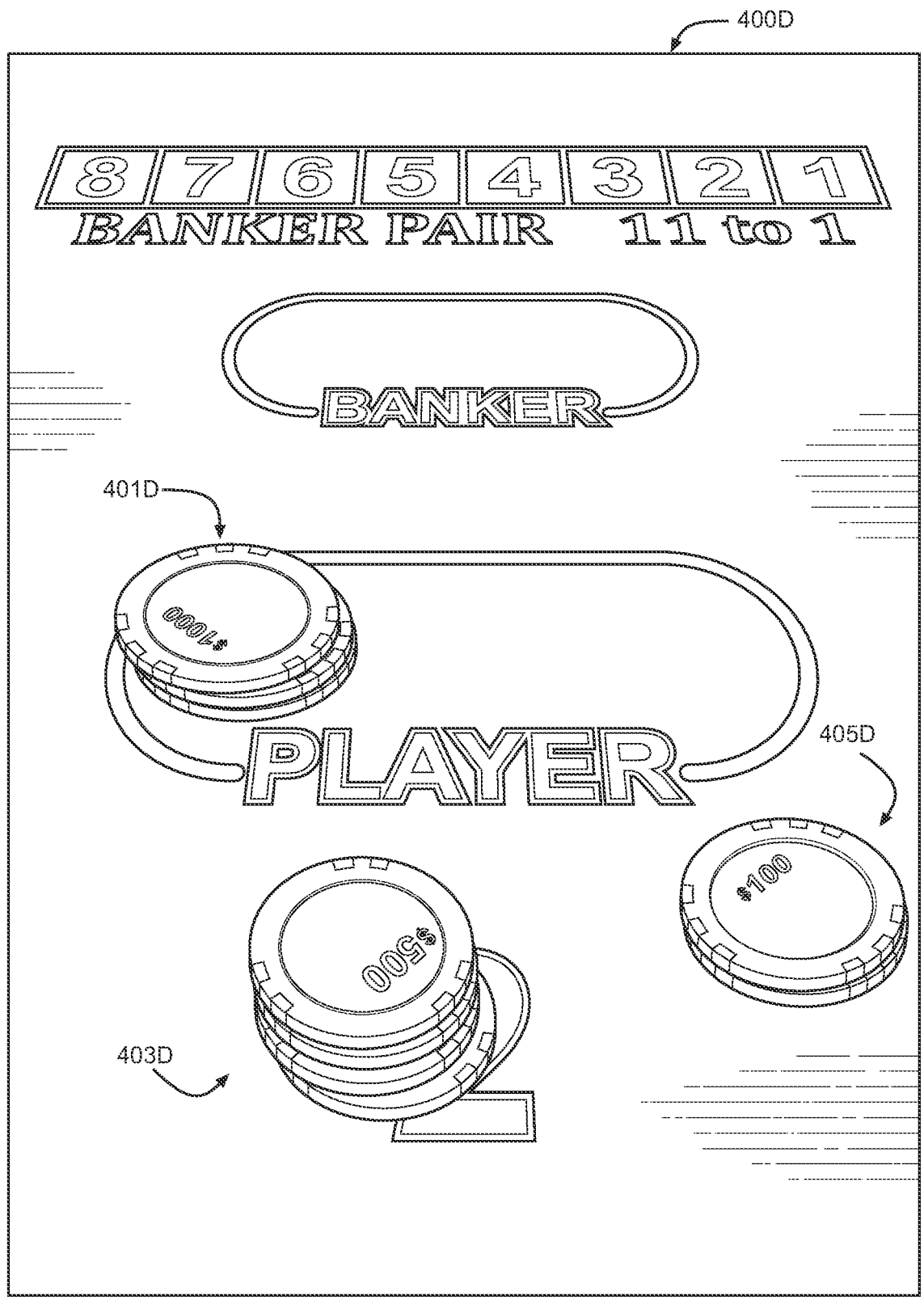
Figure 4E:
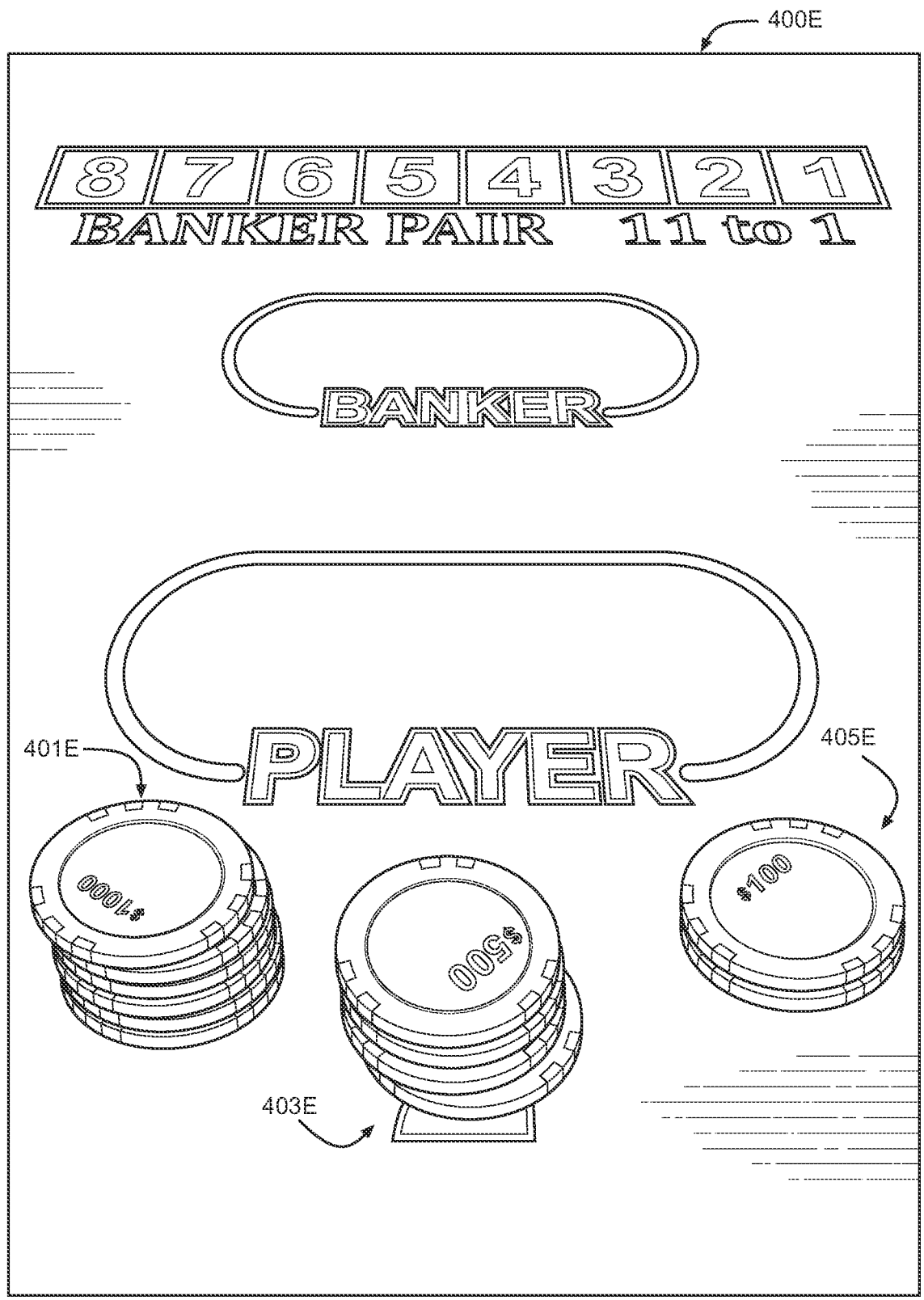

Turning now to FIGS. 4B-4E, it may be assumed that each of the wagers 401a, 403a and 405a of FIG. 4A resulted in a respective win and thus a payout is due for each respective wager. In accordance with the decremented payout method, the payouts for the three wagers are provided in a particular manner, one at a time, as a mechanism for confirming to the table system (e.g., game controller) that there were three (3) distinct wagers placed on the Player wager placement position of player position 2 for the current hand. Thus, as illustrated in FIG. 4B, the dealer first provides the payout for the wager 405a (now referred to as wager 405b since it is illustrated in screen 400B of FIG. 4B) by adding the chips comprising the payout (also referred to as payout chips) to the wagering chip comprising the wager and then (as illustrated in FIG. 4C), simultaneously clearing the resulting chip stack (referred to as element 405c in FIG. 4C) from the bet spot. Next, as represented in FIG. 4D, the dealer adds the payout chips for the wager 403a to the stack of wagering chips comprising the wager and the resulting stack (referred to as element 403d in FIG. 4D) is simultaneously cleared from the bet spot. Finally, as represented in FIG. 4E, the dealer adds the payout chips representing the payout for wager 401a to the wagering chips comprising that wager and the resulting stack of chips (referred to as element 401e in FIG. 4E) is simultaneously cleared from the bet spot. Thus, each distinct wager on a given bet spot is paid individually and then removed or "decremented" from the position. The system may compare the wagered chips to paid chips to verify correct payment and may alert the dealer on any under or over payment.

It should be noted that while the wagers (and payouts) were cleared from the bet spot right-to-left in the example of FIGS. 4A-4E, this was done as an example only and there is no particular order or direction of clearing the bets/payouts from the bet spot that is required for embodiments described herein. So long as the chips comprising the payout and the chips comprising the wager for which the payout is being provided are cleared from the table simultaneously, the decremented payout method may be useful in verifying multiple distinct wagers on a single bet spot. Further, although a providing of payouts is illustrated in FIGS. 4A-4E, a collection of fees (commissions, takes, lost wagers, etc.) may be done in a similar manner (each wager/fee being removed from the bet spot one at a time) in accordance with the decremented payout method. FIG. 9 illustrates a flowchart illustrating a similar method for verifying or modifying an initial assumption of whether a plurality of wagering chips detected at a particular wager placement position for a particular game event comprise a single wager or multiple distinct wagers on that game event.

In accordance with some embodiments, payout chips comprise gaming elements that were last detected as being present in a chip tray of the table (i.e., are not assigned to or associated with a particular player just prior to being paid out as a result of a winning wager but have just been part of the chip tray inventory).

Referring now to FIG. 5, illustrated therein is a graphical user interface (GUI) 500, which may comprise a user interface output to personnel (e.g., a dealer, supervisor or administrator of a wagering establishment) via a display such as display 340 (FIG. 3) or a display remote from a table system (e.g., a display of a computing device in a backroom or office of a wagering establishment, a supervisor station, a display of a table gaming server 110, etc.). The GUI 500 may comprise one of several tabs or screens, as illustrated in area 504, available via a software application which tracks wagers placed or other game information for at least one table system such as table system 120 (FIG. 1) or table system 400 (table 4). The GUI 500 may be viewed, for example, by a dealer or other casino personnel during play of a game or hand of a card game, as a visual software representation of all the distinct wagers that have been placed for a hand or other game event, as well as other information helpful to managing or facilitating the game event (see, for example, area 501). In some embodiments, such software may be operable to track wagers placed, payouts provided or other game information for a plurality of table systems. For purposes of the present example, it may be assumed that the GUI 500 is outputting information regarding a single table system, which comprises a physical table and a corresponding virtual table for outputting wagering activity in a graphical representation, the wagering activity being both physical wagers placed on a game event being played on the physical table and remote wagers placed on the game event).

The GUI 500 includes various areas via which a user may access or view information. Area 501, for example, outputs a representation of the seven physical player positions or physical wager placement positions provided via a physical table associated with the GUI 500 (in sub-area 501*a*), and in particular provides a virtual bet spot for each distinct wager at each such physical wager placement position by filling in a circle at a given player position to indicate a virtual bet spot and that a distinct wager has been identified at that bet spot of the player position (and may also include other bet spots that are not bet spots associated with player positions of the physical table, such as Tie bet spots). Thus, for example, area 501*a* indicates that three distinct wagers have been placed on player position 7 (the first position on the left, as one is facing the dealer, as shown in the example table configuration of FIG. 3) because all three circles at this player position are filled in while area 501*a* indicates that only one virtual bet spot and thus one distinct wager has been detected at player position 6 (the second position on the left, as one is facing the dealer, as shown in the example table configuration of FIG. 3) because only one circle of the circles at this player position is filled in. In accordance with one embodiment, blank circles indicate that no virtual bet spot has been created (i.e., that no distinct wager has been detected at a bet spot of this player position); in accordance with one embodiment, a blank circle is effectively a placeholder for a virtual bet spot or distinct wager not yet detected at a physical bet spot such as one at a player position. Although three circles are indicated at each player position, different numbers of circles, virtual bet spots or placeholders for virtual bet spots may be utilized in alternate embodiments.

In other embodiments, different visual mechanisms may be implemented to indicate how many virtual bet spots have been generated at a particular player position for a particular hand or other game event (or how many distinct wagers have been detected at a given player position). For example, no graphical representation at all may be output (e.g., no blank circle) at a player position when there is not a need to indicate a virtual bet spot as having been generated at that player position. In another example, different shapes other than circles may be used to indicate virtual bet spots. In yet another example, unique identifiers for each distinct wager may be output to represent a virtual bet spot (e.g., which may be generated upon a distinct wager being detected). The embodiments described herein are not limited to any particular mechanism or visual representation of a plurality of virtual bet spots or a plurality of distinct wagers at a given physical bet spot or player position, so long as the detection or recognition of each distinct wager is effectively output or communicated to a dealer or other persons.

One may notice that different fill is used in different circles in area 501*a* of GUI 500. In accordance with some embodiments, wagers or players may be placed into different categories or associated with different characteristics or statuses. In accordance with one embodiment, different fill (or a different color) used to fill in a circle may be used to convey a particular category, characteristic or status of the wager or player corresponding to the virtual bet spot represented by the filled in circle. For example, (i) black fill in a circle may indicate that the player corresponding to the wager represented by that virtual bet spot is a rated player (in some embodiments, the particular rating may also be visually represented); (ii) hashed fill in a circle may indicate that the player corresponding to the wager represented by that virtual bet spot is an anonymous player (e.g., no player identifier, name, etc. is known for the player); and (iii) dotted fill in a circle may indicate that the player corresponding to the wager represented by that virtual bet spot is a known or identified player. Of course, any type of characteristic, status or category of a wager and/or player may be utilized and the embodiments described herein are not limited to utilizing any particular visual representation (e.g., fill or color) for any particular characteristic, status or category (and in some embodiments such information may not be represented at all via the visual representation of a virtual bet spot).

Turning now to other areas of GUI 500, it can be appreciated that GUI 500 indicates various information that may be useful to managing, tracking and facilitating a game event such as at least one hand of a card game. For example, area 502 indicates various information for a particular pit (or for the casino at large) within which the corresponding table system is located. Area 501*b* indicates the casino win/loss (e.g., within a predetermined period of time, number of hands, since this data has been reset, etc.). Area 501*c* indicates the win/loss for the particular show being utilized for the current game event (e.g., within a predetermined period of time, number of hands, since this data has been reset, since the shoe has been reshuffled or restocked, etc.). Area 501*d* indicates the shoe game number for the shoe being utilized for the current game event. Area 501*e* indicates wagering limits for the corresponding table system. Area 501*f* indicates the chip tray variance. In accordance with some embodiments, a table system such as that described herein may be operable to alert a user (e.g., gaming establishment personnel) if a variance is identified as between RFID-enabled chips which are expected to be in the RFID-enabled chip tray and RFID-enabled chips which are actually detected as being in the RFID-enabled chip tray. A difference or variance between expected data (e.g., an expected value, count and/or particularly identified chips which are expected to be in the RFID-enabled chip tray based on previously determined data and one or more intervening transactions or game events) and actual data (e.g., an actual value, count and/or particularly identified chips which are detected to be in the RFID-enabled tray) is referred to herein as a "chip tray variance." Area 501*g* indicates the current date (e.g., month and day). Area 503 includes shortcuts or virtual buttons to other screens, menus or information accessible via GUI 500.

Referring now to FIG. 6, illustrated therein is a graphical user interface (GUI) 600, which may comprise a user interface output to personnel (e.g., a dealer, supervisor or administrator of a wagering establishment) via a display such as display 340 (FIG. 3) or a display remote from a table system (e.g., a display of a computing device in a backroom or office of a wagering establishment, a supervisor station, a display of a table gaming server 110, etc.). In some embodiments, a GUI such as GUI 600, GUI 500 or a similar GUI may also be output to players participating in a game event at a particular table system (e.g., via a display visible to at least one player physically present at or near the physical table of the table system or via an interface visible to a remote player via a player device). For example, in some embodiments it may be desirable to output a GUI of the virtual table corresponding to a particular physical table in order to help players keep track of the various wagers being placed on respective wager placement areas (whether by players physically present at the physical table or players participating remotely) but it may not be desirable to output to the players some other information illustrated in GUI 600 (e.g., the information in area 605 may not be the type of information output to players and/or some details of player information output in area 603 may be omitted in a GUI output to players, for purposes of retaining player privacy).

The GUI 600 may comprise one of several tabs or screens available via a software application which tracks wagers placed or other game information for at least one table system such as table system 120 (FIG. 1) or table system 400 (table 4) and provides an alternate or more detailed view of the distinct wagers and/or players recognized at the wager placement positions of a physical table and/or remote wagers being placed on a particular game event being played at the physical table. Thus, as in GUI 500, GUI 600 illustrates a representation of each distinct wager (and, in some embodiments, information about the player who placed the corresponding wager) and allows for more than one distinct wager to be recognized and represented at a given wager placement position or bet spot, such as one of the player positions 1-7 of a baccarat table (e.g., such as that illustrated in FIG. 3) and/or a shared or common bet spot. The GUI 600 may be viewed, for example, by a dealer or other casino personnel during play of a game or hand of a card game, as a visual software representation of all the distinct wagers that have been placed for a hand or other game event, as well as other information helpful to managing or facilitating the game event (see, for example, area 603). In some embodiments, such software may be operable to track wagers placed, payouts provided or other game information for a plurality of table systems. For purposes of the present example, it may be assumed that the GUI 600 is outputting information regarding a single table system.

The GUI 600 includes various areas via which a user may access information. Area 601, for example, outputs various information regarding a particular table system or current game session at a particular table system. Sub-area 603*a* indicates a unique session identifier and a unique game identifier for the current game and the current gaming session (in other embodiments, one or both of this data may be omitted). The rest of area 603 outputs detailed information on each distinct wager and corresponding player identified based on data received from a detecting mechanism at any of the wager placement positions of the corresponding physical table, including wager placement positions at the player positions 1-7 of a physical baccarat table. Sub-area 603*b*, for example, indicates that there are three (3) distinct wagers detected at a physical wager placement position of player position 1 of the table: (i) one wager placed by an anonymous player; (ii) another wager placed by a player with a player identifier of 123001; and (iii) third wager placed by a player with a player identifier of 123002 (in some embodiments names of players may also be displayed in association with a player identifier). In embodiments in which a given player position includes more than one wager placement position (e.g., in a baccarat game there may be both a Player wager placement position and a Banker wager placement position at a given physical player position), the information output in GUI 600 may further include details regarding which particular wager placement position of a given player position the wager has been detected on. There is additional detailed information shown for each of these players, such as a player identifier, a buy-in amount, an average bet of the player, a time at which the player began wagering in the current gaming session, etc. Sub-area 603*c* indicates that currently there is only a single distinct wager and player that was detected at player position 2, and provides information about this player with respect to this detected wager. Sub-area 603*d* indicates that only a single distinct wager has thus far been detected at player position 3 (and provides information about the player with respect to the current wager). Sub-areas 603*e*-603*h* indicates that currently no distinct wagers have been detected at any of player positions 5-8. In accordance with some embodiments, each window in area 603 that defines a distinct wager and information about the player associated with that wager may comprise a virtual bet spot generated at the corresponding player position or for the corresponding physical bet spot of the table (e.g., in response to detecting a distinct wager at the player position or bet spot). Subarea 601*i* includes additional menus or links which, when selected by a user, may provide the user with additional information related to the table system or game (e.g., information on players and/or bets).

Area 605 includes various information related to the current game and/or table system, which may aid casino personnel to facilitate a game session or find out information regarding the history or current status of the table system or game session. For example, the win/loss of the last game, the win/loss of the current shoe, the current inventory of the chip tray (and any variance alerts) and other data may be output, as illustrated in FIG. 6. It should be noted that the types of data output in area 605 is exemplary only and not intended in a limiting fashion.

It should be noted that GUI 600 may be continuously modified and updated throughout a game or progress in a game event (e.g., as additional distinct wagers are detected at various physical wager placement positions or remote wagers are received, the information about these additional distinct wagers and the players who are associated with them may be added to the sub-area of the virtual table such as to the appropriate virtual wager placement position). In accordance with one embodiment, the information in area 603 of GUI 600 is refreshed for each new bet or hand of a game or in response to some other triggering event (e.g., as a new bet is detected, as a payout is provided or a fee is collected for a particular wager, etc.).

In accordance with some embodiments, "detecting" that a distinct wager has been placed at a particular physical wager placement position of a physical table may comprise, for example, receiving data from an antenna associated with that player position of the table (the data indicating the wager, such as wager amount, chip identifiers comprising the bet, etc.). In accordance with some embodiments, "detecting"

that a distinct wager has been placed at a particular wager placement position of a table may comprise receiving a signal or data from a server device operable to facilitate remote betting (indicating that a remote player has placed a wager at a particular player position).

Figure 7:
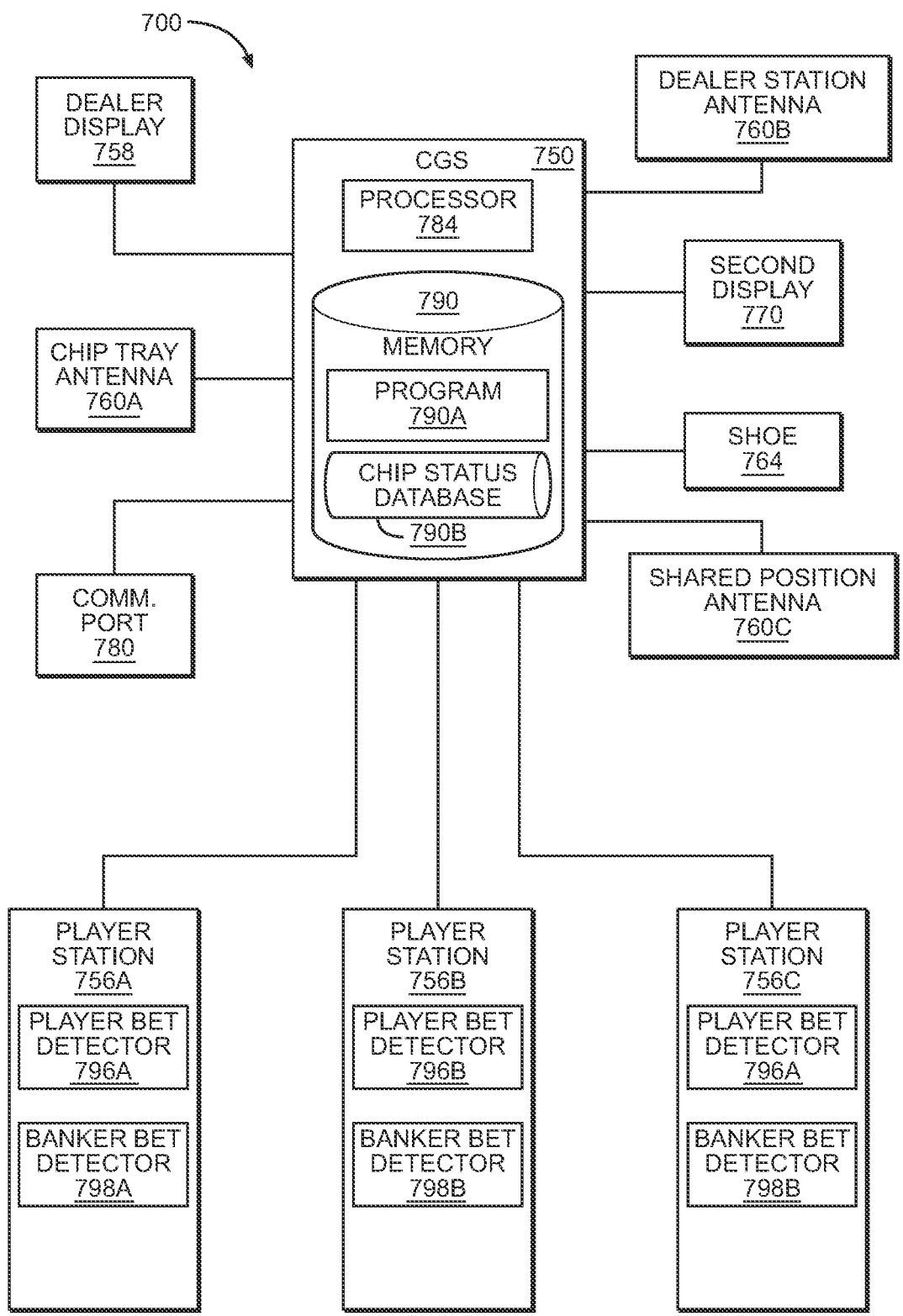
FIG. 7 illustrates a block diagram of a table system operable to facilitate at least some embodiments described herein.

Wager information may be received from an antenna or other detecting mechanism of a table (or from a server or other device) by a processor of a table and used by the processor to update a user interface such as GUI 500 and/or GUI 600. FIG. 7 illustrates a block diagram of one example of a table system 700 and its components, one that may be useful in embodiments described herein and in particular in obtaining data from RFID components of a physical table and using the data to update a GUI output to a dealer or other casino personnel or having a game controller use the data to track, manage, determine or confirm wagers placed, collected or paid for a given game event at the table system. In some embodiments, the data identified and analyzed by a table system such as table system 700 may be used to output information to players participating in a game event being played at the table (whether to players physically present near the table or to remote players). For example, as described herein a GUI similar to that described with respect to FIG. 5 and/or FIG. 6 may be output to one or more players of a game at a table, to indicate to the players how many distinct wagers have been detected at each wager placement position of the table (whether the data in such a GUI be based on physical RFID chips placed on bet spots of the table or based on online or electronic bets placed by remote players). In such embodiments, at least some information regarding the players associated with each distinct wager may not be included (e.g., to preserve the privacy of the players). For example, only a number of distinct wagers (or number of virtual bet spots) at each player position or shared bet spot and the amount of the wager (or whether the wager is on Banker, Player or Tie, in the case of a Baccarat game) may be output to all players of the table.

Referring now to FIG. 7, illustrated therein is a block diagram of a table system 700 consistent with some embodiments described herein. The table system 700 may comprise, for example, a table system 120 of FIG. 1. The table system 700 may be implemented as a system controller, a dedicated hardware circuit, an appropriately programmed computer which is a component or peripheral device of a table for facilitating a card game, or any other equivalent electronic, mechanical or electro-mechanical device.

The table system 700 comprises a CGS 750, which includes at least one a processor 784, such as one or more INTEL® PENTIUM® processors. The processor 784 may be in communication with a memory 790 and a communications port 780 (e.g., for communicating with one or more other devices). The memory 790 may comprise an appropriate combination of magnetic, optical and/or semiconductor memory, and may include, for example, Random Access Memory (RAM), Read-Only Memory (ROM), a compact disc, tape drive, and/or a hard disk. The memory 790 may comprise or include any type of computer-readable medium. The processor 784 and the memory 790 may each be, for example: (i) located entirely within a single computer or other device; or (ii) connected to each other by a remote communication medium, such as a serial port cable, telephone line or radio frequency transceiver. In some embodiments, the table system 700 may comprise one or more devices that are connected to a remote server computer for maintaining databases.

The memory 790 may store a program 790A for controlling the processor 784. The processor 784 may perform instructions of the program 790A, and thereby operate in accordance with at least one embodiment described herein. The program 790A may be stored in a compressed, uncompiled and/or encrypted format. The program 790A may include program elements that may be necessary or desirable, such as an operating system, a database management system and "device drivers" for allowing the processor 784 to interface with computer peripheral devices (e.g., detecting components, an RFID-enabled chip tray, an electronic shoe, a camera, any of which may provide data to the processor 784). Appropriate program elements are known to those skilled in the art, and need not be described in detail herein. In accordance with some embodiments, program 790A, a subroutine or module of program 790A or another program stored in memory 790 (or otherwise accessible to processor 784) may comprise instructions for applying at least some of the processes or functionalities described herein (e.g., determining and/or confirming, based on data received from at least one detecting component, whether a gaming element newly acquired at a wager placement position is part of an existing wager/stack or should be recognized as a new wager/stack). Process 800 (FIG. 8) and Process 900 (FIG. 9) each comprises a distinct example of a subroutine or process that may be stored in memory 790, such as a part of program 790A.

The term "computer-readable medium" as used herein refers to any medium that participates in providing instructions to processor 784 (or any other processor of a device described herein) for execution. Such a medium may take many forms, including but not limited to, non-volatile media, volatile media, and transmission media. Non-volatile media include, for example, optical or magnetic disks, such as memory 790. Volatile media include dynamic random access memory (DRAM), which typically constitutes the main memory. Transmission media include coaxial cables, copper wire and fiber optics, including the wires that comprise a system bus coupled to the processor 784. Transmission media can also take the form of acoustic, electromagnetic, or light waves, such as those generated during radio frequency (RF), microwave, and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in carrying one or more sequences of one or more instructions to processor 784 (or any other processor of a device described herein) for execution. For example, the instructions may initially be borne on a magnetic disk of a remote computer. The remote computer can load the instructions into its dynamic memory and send the instructions over a telephone line using a modem. A modem local to a table system 700 may be operable to receive the data on the telephone line and use an infrared transmitter to convert the data to an infrared signal. An infrared detector can receive the data carried in the infrared signal and place the data on a system bus for processor 784. The system bus may carry the data to a main memory, from which processor 784 may retrieve data and execute instructions. The instructions received by main memory may optionally be stored in memory 790 either before or after execution by processor 784. In addition, instructions may be received via communication port 780 as electrical, electromagnetic or optical signals representing various types of information. According to some embodiments of the present invention, the instructions of the program 790A may be read into a main memory from another computer-readable medium, such from a ROM to RAM. Execution of sequences of the instructions in program 790A may cause processor 784 to perform at least some of the functions described herein. In alternate embodiments, hard-wired circuitry may be used in place of, or in combination with, software instructions for implementation of at least one embodiment described herein. Thus, embodiments described herein are not limited to any specific combination of hardware and software.

The memory 790 may also store at least one database, such as chip status database 790B. In some embodiments, some or all of the data described herein as being stored in the database 790B may be partially or wholly stored (in addition to or in lieu of being stored in the memory 790 of the table system 700) in a memory of one or more other devices, such the table game server 110 (FIG. 1). In accordance with some embodiments, the chip status database may store chip identification data and/or chip status data (e.g., denomination, unique chip identifier, chip set identifier, gaming establishment identifier, chip value, player identifier associated with chip identifier, bankroll identifier associated with a chip identifier, validity of chip, etc.). In some embodiments, the memory 790 may store additional data regarding movement, location or wagering activity which has occurred on the table. For example, chip movement history (e.g., an indication of which antennas or table bet positions a particular chip has been acquired at, a time at which it was acquired at a particular antenna, a time at which it was determined to no longer be at that antenna, etc.) may be stored (e.g. for determining shared bets). In some embodiments, a history of chip movements may be stored (e.g., in a file-based archive log) on another device (e.g., in a memory of table game server 110 of FIG. 1).

In some embodiments, chip status database 790 or another table or memory device may be used to dynamically track stacks of chips or wagers for a game event. For example, the database or table may be updated as data identifying a newly acquired wagering chip acquired by a detecting component of a particular wager placement position is received and the CGS 750 may determine whether to add the newly acquired/identified wagering chip to an existing stack/wager stored in the database or table for that wager placement position or to create a new entry indicating an additional distinct stack/wager as having been identified for that wager placement position. The CGS may be programmed (E.g., via program 790A) to recognize a newly acquired gaming element as part of a previously identified stack/wager based on specified criteria or to create a new record or entry and thus recognize the newly acquired gaming element as a new and distinct stack/wager if this criteria is not satisfied. For example, in one embodiment if the acquire time of a first gaming element (the time at which the first gaming element was first acquired or detected at the particular wager placement position) is less than a predetermined period of time (e.g., 1.5 second) from an acquire time of a second gaming element, the first gaming element and the second gaming element may be identified in the database or table as being part of the same wager (e.g., two gaming elements that are placed on the wager placement position less than 1.5 seconds apart are assumed to be part of the same wager) but if the acquire time for the first gaming element is determined to be equal to or more than the predetermined period of time (e.g., 1.5 seconds) apart from the acquire time of a second gaming element then the two gaming elements may be considered to comprise 2 distinct wagers and may be stored in the database or table as two distinct wagers.

The processor 784 is also operable to communicate with one or more display devices: (i) a dealer display 758 (e.g., one or more displays such as display 340 and/or display 322 of FIG. 3) and a second display 770. The second display 770 may comprise, for example, a display for displaying historical outcomes or other game information to a player (e.g., a trend board, such as described with respect to display 350 of FIG. 3). The dealer display 758 may output information such as (i) prompts for how much should be collected from players in commission or losing wagers (e.g., for each player position involved in the hand); (ii) prompts for how much should be paid out to players for winning wagers (e.g., for each player position involved in the hand); (iii) prompts for providing payouts in accordance with the decremented payout method described with respect to FIG. 4A-4E (e.g., an order in which the payouts are to be provided, or fees are to be collected, for a plurality of distinct wagers at a given physical bet spot); (iv) tray variance or out-of-balance alerts, informing the dealer of missing chips from the RFID-enabled chip tray; and/or (v) other information regarding a status of the game, including information regarding a status of one or more wagers or RFID-enabled chips being used on the table. In some embodiments, one or both of the displays 758 and 770 may include or have associated therewith its own processor, memory and program (and may be operable to communicated data to and/or from the processor 484). Either of the display devices 758 and 770 may comprise, for example, one or more display screens or areas for outputting information related to game play on the gaming system, such as a cathode ray tube (CRT) monitor, liquid crystal display (LCD) screen, or light emitting diode (LED) screen. In some embodiments, either of the display devices 758 and 770 may comprise a touch screen.

As described herein, in some embodiments an RFID-enabled chip tray may comprise one or more antennas for reading information from RFID-enabled chips placed in the chip tray. In such embodiments, the processor 784 is further operable to communicate with the one or more chip tray antenna(s) 760A. The one or more antenna(s) 760A may be operable to read data from one or more chips placed within a chip tray (e.g., chip identifier, chip set identifier, chip denomination, etc.). In accordance with some embodiments, the CGS is programmed to recognize a chip that is detected as having been placed on a wager placement position as a payout chip if that chip was recognized by the CGS as being in the chip tray (e.g., based on data received from the chip tray antenna(s) 760A immediately prior to being detected on the wager placement position.

The processor 784 is further operable to communicate with a shared position antenna 760C, which comprises at least one antenna on a shared or common betting area for recognizing chips placed (and removed from) the shared or common betting area. It should be noted that although Player bet spots and Banker bet spots at various physical player positions of a physical table may also, by virtue of the possibility that more than one wager may be placed on such bet spots by more than one player for a given game event, be considered shared betting areas, for purposes of many embodiments described herein a shared or common bet spot is considered to be a wager placement position that is not associated with any particular physical play position.

The processor 784 is further operable to communicate with a plurality of detecting components (e.g., RFID antennas or optical imaging components) at physical player stations (also referred to as physical player positions) of the physical table. As described with respect to FIGS. 2 and 3, in some embodiments each physical player position of a physical table may have a corresponding Player bet spot area and a Banker bet spot area and each such area may have associated therewith its own antenna or other detecting component for determining that a wagering chip or other gaming element has been placed within this area and thus that a wager has been placed on either the Player win outcome or the Banker win outcome. The table system 700 illustrates three player positions 756 (756*a*, 756*b* and 756*c*) as each having two detecting components associated therewith: a Player Bet detector 796 and a Banker Bet detector 798. Thus, player station 756*a* has associated therewith Player Bet detector 796A and Banker Bet detector 798A, player station 756B has associated therewith Player Bet detector 796A and Banker Bet detector 798B and player station 756C has associated therewith Player Bet detector 796C and Banker Bet detector 798C. Each detecting component may be uniquely identifiable by, for example, (i) a unique identifier associated therewith, and (ii) an identification of a port or other component of the table associated with the antenna (e.g., the port into which the antenna is plugged into may have a unique identifier associated therewith) and such unique identifier may be transmitted to or recognized by the processor 784 when chip information regarding a chip acquired by a respective detecting component is transmitted to the processor 784, such that the processor 784 may be programmed to determine which player position and which wager placement position within the player position the wagering chip has been placed on. In some embodiments, a single player station 756 may include detecting components associated with two or more players. For example, one detecting component may be intended for a first player playing the game at the table and another detecting component for a second player (e.g., a "back bettor") who may be betting along with or in association with the first player, either remotely or from essentially the same location, but whose chips and betting activity is to be separately tracked. In some embodiments, the chip status database 790B may store detailed data with information regarding chips identified at a table, such details being associated with a chip identifier of each chip for which data is stored (e.g., chip value, chip denomination, chip set identifier, bankroll identifier or other indicator of a category or characteristic associated with a chip, time of acquisition, which stack or wager the chip is associated with, etc.). Storing such data at the table may allow for faster RFID scanning or other detecting, since the system will not need to obtain a lot of data every time a chip is acquired or recognized by an antenna or other detecting component of a table (e.g., only the chip identifier may be necessary and additional information may be looked up by the system based on the chip identifier from a local database or memory).

In some embodiments, the CGS 750 may receive from an antenna or other detecting component of the table data regarding chips placed on a physical bet spot (e.g., a particular player position or common betting area) and determine, based on this data and additional data stored in memory (e.g., a player identifier, bankroll identifier or last player position associated with the chip that has now been acquired by a detecting component) that a distinct wager has been made by a particular player or for a particular wager placement position. In some embodiments, the processor 784 may receive data verifying that appropriate payouts have been made (and/or appropriate fees have been paid) for multiple distinct wagers detected at a given wager placement position or at a given antenna or other detecting component of the table. In some embodiments, the CGS 750 may update a GUI (e.g., such as GUI 500 and/or 600) to indicate data received regarding distinct wagers detected, payouts provided or fees collected for a hand or other game event.

In some embodiments, the CGS 750 is further operable to communicate with an electronic shoe 764. The shoe 764 may be an intelligent shoe such as the IS-T1™ and IS-B1™ or the MD1, MD2 sold by SHUFFLE MASTER or other such devices. The shoe 764 may be able to determine which cards are being dealt to which player station, through RFID technology, image recognition, a printed code on the card (such as a barcode), or the like. The embodiments described herein are not dependent on any particular technique used to recognize cards dealt in a card game (or cards remaining as available to be dealt). Further information about intelligent shoes may be found in U.S. Pat. Nos. 5,941,769 and 7,029,009, both of which are incorporated by reference in their entireties and U.S. Patent Application Publications 2005/0026681; 2001/7862227; 2005/0051955; 2005/0113166; 2005/0219200; 2004/0207156; and 2005/0062226 all of which are incorporated by reference in their entireties. In place of an intelligent shoe, cameras, such as may be used with pattern recognition software to detect what cards have been dealt to what player stations and what chips have been wagered at particular player stations. One method for reading data from playing cards at table games is taught by German Patent Application No. P44 39 502.7. Other methods are taught by U.S. Patent Application Publication 2007/0052167 both of which are incorporated by reference in their entirety.

The CGS 750 is further operable to communicate with a dealer station antenna 760B, which comprises one or more antennas placed in a dealer area of the corresponding table. The dealer station antenna 760B may be operable to detect RFID-enabled chips which have been placed within its acquisition area, such as chips the dealer places in the area for recognizing by the system prior to placing them into the dealer tray or paying them to a player.

In accordance with some embodiments CGS 750 may be operable to receive data from an antenna such as an indication of a time at which each chip has been removed (or is no longer detected) at an antenna. Based on the times at which different chips have been removed (or were no longer detected) at an antenna, CGS 750 may be programmed to associate chips with one another or with a distinct wager. For example, if for a single round or hand of a game, if chips A, B and C are determined to have been removed from antenna 1 at time X and chips D, E and F are determined to have been removed from antenna 1 at time Y, then processor 784 may conclude that chips A, B and C correspond to a first distinct wager while chips D, E and F correspond to a second distinct wager (even if times X and Y are only one or a few seconds apart).

Figure 8:
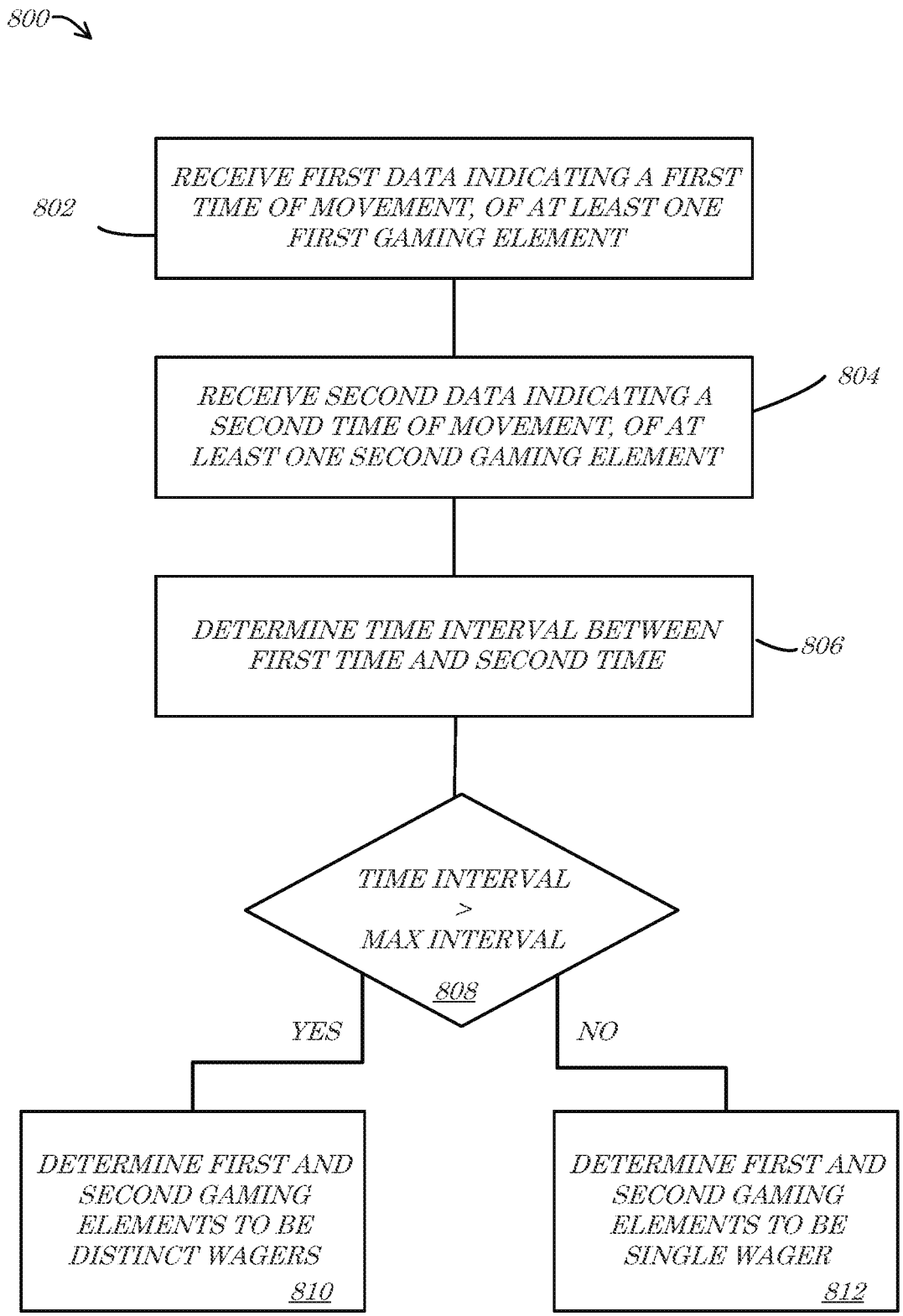
FIG. 8 illustrates a flowchart of an example process consistent with one or more embodiments described herein.

Turning now to FIG. 8 and FIG. 9, illustrated therein are two distinct flowcharts of respective example processes (FIG. 8 illustrates process 800 and FIG. 9 illustrates process 900), each of which is consistent with some embodiments described herein. Process 800 comprises a process for implementing at least some of the embodiments described herein, such as embodiments providing for determining whether a plurality of gaming elements (e.g., wagering chips) detected on a single or particular bet spot (e.g., player position or shared bet spot) comprise a single wager or a plurality of distinct wagers. Process 900 comprises a process for implementing embodiments in which a preliminary determination of whether a plurality of gaming elements comprises a single wager or distinct wagers is confirmed or modified based on subsequently received data. In one embodiment, at least a portion of process 800 and/or the process 900 may be performed continuously or repeatedly by a game controller during a game event (e.g., during a round or deal of a card game). The processes 800 and/or the process 900 may be performed, for example, by at least one of a server device operable to facilitate the identification or tracking of wagering activity for a game (e.g., a card game) and/or a player device enabling a player to play the game remotely. For example, the process 800 and/or the process 900 may be performed by at least one of (i) a table system 120 (FIG. 1); (ii) a table game server 110 (FIG. 1); and/or (iii) a processor 784 (FIG. 7). Additional and/or different steps may be added to those depicted. Not all steps depicted are necessary to any embodiment described herein. Process 600 may comprise a subroutine of a more general program. In one embodiment, process 800 and/or process 900 may comprise at least a part of program 790A (FIG. 7). The process 800 and the process 900 are each an example process of how some embodiments described herein may be implemented, and should not be taken in a limiting fashion. A person of ordinary skill in the art, upon contemplation of the embodiments described herein, may make various modifications to process 800 and/or process 900 without departing from the spirit and scope of the embodiments in the possession of applicants.

Process 800 may be performed, for example, during a particular game event in order to identify whether a first gaming element and a second gaming element detected at a particular wager placement position and for a particular gaming event comprise a single wager (e.g., are in a single stack representing a single wager) or comprise two distinct wagers (e.g., wagers made by different players for the same hand or deal but placed on the same physical wager placement position). Process 800 begins in step 802 first data is received, the first data indicating a first time of movement of at least one first gaming element. The first data may comprise, for example, a time and/or date received from a detecting mechanism of the table system (e.g., an RFID antenna at a particular physical wager placement position of a physical table), such as a time at which a gaming element was detected or acquired by the gaming component as being on the associated physical wager placement position or a time at which a previously detected gaming element was detected or determined to no longer be present or within range of the detecting component. In one embodiment, the first data indicating the first time of movement comprises a time at which the detecting component initially detected or acquired the first gaming element at the wager placement position associated with the detecting component. In another embodiment, the first data indicating the first time of movement comprises a time at which the detecting component detected that the first gaming element (assuming the first gaming element was previously detected as being on the wager placement position) was no longer present at the wager placement position (i.e., the detecting component no longer detected the first gaming element, thus indicating that the first gaming element had been removed, such as by a dealer).

In step 804, second data is received, the second data indicating a second time of movement, in this step the time of movement being a time of movement of a second gaming element. The second data may comprise, for example, a time and/or date received from the same detecting mechanism as the first data in step 802 had been received for and for the same game event and for the same physical wager placement position but in this step indicating data corresponding to a different, second, gaming element. In one embodiment, the second data indicating the second time of movement comprises a time at which the detecting component initially detected or acquired the second gaming element at the wager placement position associated with the detecting component. In another embodiment, the second data indicating the second time of movement comprises a time at which the detecting component detected or determined that the second gaming element was no longer present at the wager placement position (i.e., the detecting component no longer detected the second gaming element, thus indicating that the second gaming element had been removed, such as by a dealer).

It should be noted that the adjective "first" and "second" as used in relation to the time of movement is not intended to imply an order in which the movements occurred or any type of hierarchy among the times of movement. The qualifiers "first" and "second" are used merely to distinguish which gaming element the times of movement correspond to and to allow each time of movement to be distinctly and uniquely referred to in the present description: the first time of movement corresponding to a movement of the first gaming element and the second time of movement corresponding to the second gaming element.

In step 806, a time interval between the first time of movement and the second time of movement is determined. In other words, it is determined how much time has passed between the first time of movement and the second time of movement. The time interval may be measured in relatively small units, such as seconds or milliseconds, since movements of gaming elements onto and off of bet spots of a table occur relatively quickly during a card game.

In step 808, the time interval determined in step 806 is compared to a maximum time interval and it is determined whether the time interval is greater than the maximum interval (in other embodiments it may be determined whether the time interval is greater than or equal to the maximum time interval). In some embodiments, step 808 may comprise retrieving the maximum time interval from memory.

It should be understood that polling frequency (i.e., how often a detecting component checks for wagering chips within range of the detecting component or how often a game controller polls the detecting component for data indicating which gaming elements are currently detected by or within range of the detecting component) may also be modified or set such that the frequency adequately allows a measurement of a time interval between the first time and the second time and an effective comparison to the maximum time interval being applied. For example, a polling frequency of once every millisecond would be effective in determining a time interval between a first time of movement and a second time of movement in order to determine whether the time interval is greater than, equal to or less than the maximum time interval of one second while a polling frequency of once every two seconds would not.

In accordance with some embodiments, steps 802 through 806 may occur during a portion of the game in which bets are being accepted (i.e., while betting is open and players are placing wagering chips on available bet spots in order to indicate the wagers they are placing for a game instance, hand or deal). In such embodiments, the first time of movement and the second time of movement may comprise respective times at which each respective game element was first acquired by the relevant detecting component.

In accordance with some embodiments, gaming elements (e.g., wagering chips) that are placed on or detected as having been placed on a particular wager placement position within a certain time of one another are considered (or at least preliminarily considered) to be part of a single wager or stack. For example, in one embodiment wagering chips acquired or detected as having been placed on a wager placement position within one-and-a-half (1.5) seconds of each other are considered to be part of a single wager such that if two chips are acquired or first detected on the wager placement position more than a second-and-a-half apart they are considered (or at least preliminarily considered) to be two distinct wagers or stacks. Of course other time criteria may be utilized (e.g., two seconds) and the particular time interval that causes two gaming elements to be considered a single wager as opposed to separate wagers may be selected by a game operator based on their preference or experience with wagering speeds and activities.

It should be noted that the time interval during which acquired chips are considered part of the same wager can be extended by further chip acquisitions. Once the entire maximum interval (e.g., 1.5 seconds) has passed with no further chip acquisitions, the particular "stack" or wager towards which the acquired chips were counted or attributed may be locked in and any additional chips acquired by the detecting component for the particular game event at the particular wager placement position will be considered to be part of a second distinct wager or "new stack".

In some embodiments, the process 800 may not accurately account for or recognize that two gaming elements are part of the same wager (e.g., a player may hesitate and wait more than the maximum time interval before adding yet another chip to their stack, and the system may mistakenly categorize the added chip as being a new distinct wager). If a particular gaming element should really be attributed to the same wager as a previously acquired gaming element but is mistakenly categorized by the system as being a new distinct wager, this can be corrected in various manners, some example of which include:

(i) the chips considered to be part of the first wager and the chips considered to be part of the second wager (but which are in actuality part of the same wager) can be removed from the wager placement position (out of range of the detecting component) during the betting phase and then replaced on the wager placement position together, thus resulting in the system recognizing all the chips as being part of the same wager (in some embodiments a dealer may do this manually in order to correct apparent system errors);

(ii) for winning wagers, the chips can be removed from the wager placement position prior to payout and then replaced (chips removed and replaced in this way will update the distinct wagers recognized by the system);

(iii) for winning wagers, the chips can be paid out based on the physical stacks on the table rather than based on assumptions made by the system (i.e., the dealer can be trained to ignore incorrect payout prompts based on incorrect distinct wager assumptions made by the system when he knows two chips belong to the same player/wager by paying the win based on the two chips together) and the system may update or modify what it considers to be distinct wagers during the payout process (more on this embodiment is described with respect to process 900 (FIG. 9)); and/or (iv) for losing wagers, the chips can be removed from the wager placement position together (essentially simultaneously), thus causing the system to correct its previous assumption that the gaming elements represented different wagers.

In accordance with some embodiments (e.g., embodiments such as that illustrated in FIGS. 4A-4E), steps 802 through 806 may occur during a portion of the game in which bets are no longer being accepted and the outcome is being resolved, payouts are being made and wagers are being collected. In such embodiments, the first time of movement and the second time of movement may comprise times at which each respective game element was removed from a wager placement position (e.g., first recognized as no longer being within range of the detecting component).

In accordance with some embodiments, gaming elements (e.g., wagering chips) that are detected as having been removed from a particular wager placement position within a certain time of one another are considered (or at least preliminarily considered) to be part of a single wager or stack. For example, in one embodiment wagering chips detected or determined as being removed from a wager placement position within one (1) second of each other are considered to be part of a single wager such that if two chips are detected as having both been removed from a particular wager placement position more than one (1) second apart then they are considered (or at least preliminarily considered) to be two distinct wagers or stacks. Of course other time criteria may be utilized (e.g., two seconds) and the particular time interval between times of removal from a wager placement position that causes two gaming elements to be considered a single wager as opposed to separate wagers may be selected by a game operator based on their preference or experience with wagering speeds and activities.

In some embodiments, during the payout process the dealer places the payout chips on a stack of wagering chips representing a particular wager and removes the payout chips together with the wagering chips comprising that wager (i.e., the payout chips and the wagering chips are removed within one second of one another). In some embodiments, this removal of the payout chip(s) at the same time as a number of specific wagering chips will cause the system to identify all the wagering chips removed with the payout chips as being part of the same wager.

Returning to step 808, if it is determined that the time interval determined in step 804 is greater than the maximum time interval, the system determines that the first gaming element and the second gaming element comprise two distinct wagers. For example, if the process 800 is being performed during a betting portion of the game and the first time and the second time are respective times at which the gaming elements were first acquired by a detecting component, if it is determined that the two gaming elements were acquired more than X time apart (e.g., more than 1.5 seconds apart), each of the two gaming elements is inferred by the system to represent a distinct wager (e.g., is categorized as a different stack in the virtual memory of the system for purposes of tracking wagers or stacks for the present game event). In another example, if the process 800 is being performed during a payout resolution portion of the game and the first time and the second time are respective times at which the gaming elements are first determined to no longer be within range of the detecting component, if it is determined that the two gaming elements were removed from the wager placement position associated with the detecting component more than X time apart (e.g., more than 1 second apart), each of the two gaming elements is inferred by the system to represent a distinct wager (e.g., is categorized as a different stack in the virtual memory of the system for purposes of tracking wagers or stacks for the present game event).

If, on the other hand, it is determined in step 808 that the time interval determined in step 806 is not greater than the maximum time interval, the first gaming element and the second gaming element are inferred or determined by the system as comprising a single wager. For example, if the process 800 is being performed during a betting portion of the game and the first time and the second time are respective times at which the gaming elements were first acquired by a detecting component, if it is determined that the two gaming elements were acquired less than or equal to X time apart (e.g., less than or equal to 1.5 seconds apart), the two gaming elements are inferred by the system to represent a single wager (e.g., are categorized as being part of the same stack in the virtual memory of the system for purposes of tracking wagers or stacks for the present game event). In another example, if the process 800 is being performed during a payout resolution portion of the game and the first time and the second time are respective times at which the gaming elements are first determined to no longer be within range of the detecting component, if it is determined that the two gaming elements were removed from the wager placement position associated with the detecting component less than or equal to X time apart (e.g., less than or equal to 1 second apart), the two gaming elements are inferred by the system to represent a single wager (e.g., are categorized as belonging to the same stack in the virtual memory of the system for purposes of tracking wagers or stacks for the present game event).

As described above, inferences or determinations made during the payout resolution portion of the game may, in some embodiments, override inferences or determinations made in the betting portion of the game. For example, if during a betting portion of the game chip A and chip B were determined to be two distinct wagers (E.g., because they were acquired more than 1.5 seconds apart on the same bet spot) but then they are both removed during the payout resolution portion of the game essentially simultaneously (e.g., within a second of each other), then this new data during the payout resolution phase may cause the system to override its previous assumption and re-categorize chip A and chip B as being part of the same wager.

Consistent with the above description of example process 800, included below are some example pseudo-code portions or sub-routines that may be implemented in some embodiments to cause a game controller to identify two chips as either belonging to the same wager ("stack" in the pseudo code below) or two distinct wagers ("stacks"). The pseudo code portions below are provided for illustrative purposes only and should not be construed to limit the scope of the embodiments described herein and illustrate example sub-routines executed during wagering (i.e., during beginning of betting round). In accordance with some embodiments, when players put chips on different bet spots and these are detected (e.g., by the respective RFID antennas associated with the bet spots), the game controller creates a list of estimated Stacks for each bet spot. Each RFID antenna may be associated (e.g., in a memory of the game controller) with a list of estimated Stacks and "lastChipAcquireTime" data, the data indicating when the chips are added or removed from the antenna. The game controller is further operable to update this estimated Stacks list and "lastChipAcquireTime" data using a subroutine such as the following:

```
estimatedStacks : new List<ChipStack>; //initially estimatedStacks is
empty.
    lastChipAcquireTime: 0
/*
A. This method is used to update the estimated Stacks when the chip is added to
an Antenna (detected by an antenna).
Method "updateEstimatedStacksOnValidChipAddition" (Chip : chip)
Begin:
        Step1. Get now = current time
        Step2. if(now - lastChipAcquireTime > getInterStackMillis( ))
then // system will create a new ChipStack , if last chip was added 1.5 seconds
before.
            Step 2.1 Create newStack = Chip Stack 0
            Step 2.2 Add chip to newStack.
            Step 2.3 Add newly created stack to list
of estimatedStacks.
else // If chips are added with in 1.5 sec then we will add the chip in the last
chip Stack.
Step 2.4 if(estimatedStacks.isEmpty( )) then
            Step 2.5 estimatedStacks.add(new Chip Stack( ))
            End of If at Step 2.4
            Step 2.6 estimatedStacks.get(estimatedStacks.size( )
- 1).addChip(pChip);
            End of if in Step 2.
        lastChipAcquireTime = now // updating the lastChipAcquireTime.
End:
    Method getInterStackMillis( )
Begin:
return PROP_KEY_ANTENNA_INTER_STACK_MILLIS // currently we have
DEFAULT_ANTENNA_INTER_STACK_MILLIS = 1500 ~ 1.5 seconds.
End:
    /*
B. This method is used to update the estimated Stacks when the chip is removed
from an RFID antenna.
    Method updateEstimatedStacksOnValidChipRemoval(Chip : chip)
Begin:
Step1. Iterate over each chipStack in estimatedStacks.
    Step2. if chip Stack contains chip then
            Step2.1 chipStack.removeChipWithId(chip.getUniqueId( ))
            Step2.2 if chip Stack is empty then
```

Step 2.2.1 remove the chip Stack from list of estimatedStacks.
    [End of if at Step2.2]
  [End of if at Step2]
    [End of loop at Step1]
  End:

Referring now to FIG. 9, illustrated therein is a flowchart of an example process 900 that may be consistent with some embodiments. Process 900 comprises a process for implementing embodiments in which a preliminary determination or assessment by the system (e.g., CGS 750) of whether a plurality of gaming elements comprises a single wager or distinct wagers (e.g., which may be based on data received during a betting portion of a game) is confirmed or modified based on subsequently received data (e.g., based on data received during a payout resolution portion of the game). Process 900 begins with the assumption that a first gaming element comprising a first wagering chip and a second gaming element comprising a second wagering chip were previously recognized by the system (e.g., based on data, such as time of acquisition data for each respective wagering chip) as having been placed on a particular wager placement position for a particular game event and the system has stored in memory an indication that the first wagering chip and the second wagering chip are part of the same wager (e.g., based on previously received data, such as may have been received during a process such as process 800). For example, returning to an example described with respect to process 800 (FIG. 8), it may be assumed that if the maximum time interval is 1.5 seconds that both the first wagering chip and the second wagering chip were acquired at the same wager placement position within 1.5 seconds of each other.

In step 904, a $1^{st}$ payout chip is identified as having been added to the bet spot and in step 906 a $2^{nd}$ and distinct payout chip is identified as having been added to the bet spot. For example, an identifier of each of the payout chips may be received from a detecting component associated with the bet spot and a record or entry of chips may be retrieved based on the identifier (e.g., from a database such as the chip status database 790B (FIG. 7). The payout chips may be identified as payout chips based on a status or category associated with them in such a database or based on other data accessible to the system. For example, in some embodiments a payout chip is considered to be a chip that was last recognized (e.g., during a betting portion of the present game event) as being part of the inventory in a chip tray of the table system (thus not belonging to a player but being available to the dealer for purposes of providing payouts for winning wagers). In some embodiments the system may also recognize that the chip is being added to the bet spot not during a betting portion of the game but during a payout resolution portion of the game (i.e., after betting is closed) and this determination or recognition may also be used by the system to determine that the chips being added to the bet spots are payout chips.

In step 906, it is determined that the first wagering chip and the first payout chip were removed from the bet spot at a first time and the second wagering chip and the second payout chip were removed from the bet spot at a second time. Or, in an alternate embodiment, step 906 may comprise determining a time of removal from the bet spot of each individual chip (of each wagering chip and of each payout chip) based on data received during the payout resolution portion of the game (e.g., from a detecting component of the bet spot) and it may be determined that: (i) the time of removal of the first wagering chip is within a predetermined interval of a time of removal of the first payout chip (e.g., within 1 second), thus leading the system to conclude that the first wagering chip and the first payout chip were removed essentially simultaneously and at a first time; and (ii) the time of removal of the second wagering chip is within a predetermined interval of a time of removal of the second payout chip (e.g., within 1 second), thus leading the system to conclude that the second wagering chip and the second payout chip were removed essentially simultaneously and at a second time.

In step 908, a time interval between the first time and the second time is determined. In other words, it is determined how long it was between the time of removal of the first wagering chip and the first payout chip and the time of removal of the second wagering chip and the second payout chip (in other embodiments the determination may be whether the time interval is greater than or equal to the maximum interval). In some embodiments, step 908 or another step of process 900 may comprise retrieving the predetermined or maximum time interval from memory. The time interval determined in step 910 is then compare to a predetermined or maximum interval (step 912). If it is determined that the time interval determined in step 910 is greater than the predetermined or maximum interval, then the system updates its memory or initial assessment to indicate that the first wagering chip and the second wagering chip were part of two distinct wagers. If, on the other hand, it is determined in step 912 that the time interval determined in step 910 is not greater than the predetermined or maximum time interval than the system consider it confirmed or verified that its initial assessment that the first wagering chip and the second wagering chip are part of the same (single) wager was correct. In this example manner, data obtained during a payout resolution portion of a game may be utilized to confirm or correct data obtained during a previous (e.g., when betting is open or allowed) portion of the game and having the data obtained during the payout resolution portion of the game override the data obtained during the previous portion of the game.

The example of process 900 illustrates that, in some embodiments, a determination or recognition of respective winning wagers based on a plurality of wagering chips placed on the same bet spot for a given game event may not be dependent on time of removal of just the wagering chips or time of acquisition of the wagering chips. Rather, in some embodiments, the system waits for a corresponding amount of wager chips and payout chips to be removed from a wager placement position or antenna at the same time or substantially simultaneously, at which time that groups of chips (the wagering chips and the payout chips that are removed at essentially the same time) are identified as a separate successfully-paid winning bet.

Although various embodiments have been described herein, modifications or additional embodiments would be understood by one of ordinary skill in the art upon reading the present disclosure. For example, logic similar to that described herein may be used to identify or verify distinct wagers placed on a given Tie bet spot or a Pair bet spot. In one embodiment, Tie and Pair bets may be "tagged" to a particular player position of a physical table or they may be placed directly on the Tie/Pair bet spot and not associated with a player position. In some embodiments, when it is determined that a Tie bet or a Pair bet is a winning bet, all bets of that type (tagged and untagged) may be aggregated into a single large bet with estimated stacks that may be overridden by the actual payout amounts, similar to Banker/ Pair bets as described with respect to FIG. 9. There may also be implemented additional logic specific to Tie/Pair bets that, after a successful decremented Tie/Pair payout occurs, has the system search its memory for a previously-tagged stack and if it finds a match associates the bet created by the decremented pay to the corresponding player position.

Rules of Interpretation & General Definitions

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, SAP, SAS™ by IGT, SUPERSAS™, OASIS™ by Aristocrat Technologies, SDS by Bally Gaming and Systems, ATP, TCP/IP, gaming device standard (GDS) published by the Gaming Standards Association of Fremont CA, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A non-transitory, computer-readable medium storing instructions which cause a processor to perform a method, the method comprising:
   identifying, for a particular wagering game event, a plurality of distinct wagers placed on the particular wagering opportunity,
      wherein each wager of the plurality of distinct wagers corresponds to a respective wager-defining data and is represented on a shared physical wager placement position of the table apparatus by at least one respective gaming element that has been detected by a gaming element detecting mechanism of the shared physical wager placement position;
   determining a wager result for each of the plurality of wagers placed on the particular game wagering opportunity, thereby determining a first wager result; and
   assigning each wager result to a specific one wager and corresponding wager-defining data of the plurality of distinct wagers based on an order in which gaming elements are removed from the shared physical wager placement position of the table apparatus during a payout reconciliation phase of the wagering game event.

2. The non-transitory, computer-readable medium of claim 1, wherein the a wager result comprises at least one of a winning result, a payout amount and at least one gaming element being provided to a player as the payout amount.

3. The non-transitory, computer-readable medium of claim 1, wherein the wager-defining data comprises at least one of a particular player position and a particular player.

4. The non-transitory, computer-readable medium of claim 1, wherein for each wager of the plurality of distinct wagers the at least one of the particular player position and the particular player is associated in a database with the at least one gaming element representing a respective wager.

5. The non-transitory, computer-readable medium of claim 1, wherein assigning the first wager result to the specific wager and corresponding wager-defining data comprises assigning the first wager result to the specific wager and corresponding wager-defining data in a database for tracking wager data.

6. The non-transitory, computer-readable medium of claim 1, wherein a wager result comprises at least one gaming element being provided to a player as a payout for a winning wager and is referred to as at least one payout chip, and assigning comprises:
   identifying a first at least one payout chip and a second at least one payout chip;

identifying a first wager and corresponding first wager-defining data, the first wager being represented by at least one first gaming element previously being detected as being present on the shared physical wager placement position of the table apparatus;

identifying a second wager and corresponding second wager-defining data, the second wager being represented by at least one second gaming element previously being detected as being present on the shared physical wager placement position of the table apparatus;

receiving an indication that the first at least one payout chip has been removed from the table apparatus at a first time and along with the at least one first gaming element;

receiving an indication that the second at least one payout chip has been removed from the table apparatus at a second time that is after the first time and along with the at least one second gaming element;

assigning the at least one first payout chip to the first wager and corresponding first wager-defining data; and assigning the second at least one payout chip to the second wager and corresponding second wager-defining data.

7. The non-transitory, computer-readable medium of claim 6, wherein the method further comprises:

determining that a plurality of gaming elements detected on the shared physical wager placement position for the wagering opportunity comprise a single wager based on detecting that each of the plurality of gaming elements have been removed from the shared physical wager placement position at a same time as the one of the first at least one payout chip and the second at least one payout chip.

8. The non-transitory, computer-readable medium of claim 1, wherein the table apparatus comprises:

the first number of physical wager placement positions, each of the physical wager placement positions corresponding to a respective area of a physical table surface on which a gaming element may be placed in order to indicate a wager made by a player; and at least one gaming element detecting mechanism associated with each of the physical wager placement positions and operable to detect a gaming element being placed on and removed from an associated physical wager placement position of the first number of physical wager placement positions.

9. The non-transitory, computer-readable medium of claim 8, wherein the at least one gaming element detecting mechanism is an RFID antenna.

10. The non-transitory, computer-readable medium of claim 8, wherein the at least one gaming element detecting mechanism is an optical data detecting mechanism.

11. The non-transitory, computer-readable medium of claim 1, wherein the processor is one of a processor of the table apparatus and a processor of a server device remote from the table apparatus.

12. The non-transitory, computer-readable medium of claim 1, wherein the table apparatus is configured to facilitate a game of baccarat.

13. A physical table apparatus configured to facilitate a wagering game and including a shared physical wagering position on which multiple players can place gaming elements representing wagers and having a gaming element detecting mechanism associated with the shared physical wagering position, comprising:

a processor; and a memory storing a program for causing the processor to perform a method, the method comprising:

identifying, for a particular wagering game event, a plurality of distinct wagers placed on the particular wagering opportunity, wherein each wager of the plurality of distinct wagers corresponds to a respective wager-defining data and is represented on the shared physical wager placement position of the table apparatus by at least one respective gaming element that has been detected by the gaming element detecting mechanism of the shared physical wager placement position;

determining a wager result for each of the plurality of wagers placed on the particular game wagering opportunity, thereby determining a first wager result; and assigning each wager result to a specific one wager and corresponding wager-defining data of the plurality of distinct wagers based on an order in which gaming elements are removed from the shared physical wager placement position of the table apparatus during a payout reconciliation phase of the wagering game event.

14. The physical table apparatus of claim 13, wherein the a wager result comprises at least one of a winning result, a payout amount and at least one gaming element being provided to a player as the payout amount.

15. The physical table apparatus of claim 13, wherein the wager-defining data comprises at least one of a particular player position and a particular player.

16. The physical table apparatus of claim 13, wherein for each wager of the plurality of distinct wagers the at least one of the particular player position and the particular player is associated in a database with the at least one gaming element representing a respective wager.

17. The physical table apparatus of claim 13, wherein assigning the first wager result to the specific wager and corresponding wager-defining data comprises assigning the first wager result to the specific wager and corresponding wager-defining data in a database for tracking wager data.

18. The physical table apparatus of claim 13, wherein the wager result comprises at least one gaming element being provided to a player as a payout for a winning wager and is referred to as at least one payout chip, and assigning comprises:

identifying a first at least one payout chip and a second at least one payout chip;

identifying a first wager and corresponding first wager-defining data, the first wager being represented by at least one first gaming element previously being detected as being present on the shared physical wager placement position of the table apparatus;

identifying a second wager and corresponding second wager-defining data, the second wager being represented by at least one second gaming element previously being detected as being present on the shared physical wager placement position of the table apparatus;

receiving an indication that the first at least one payout chip has been removed from the table apparatus at a first time and along with the at least one first gaming element;

receiving an indication that the second at least one payout chip has been removed from the table apparatus at a second time that is after the first time and along with the at least one second gaming element;

assigning the at least one first payout chip to the first wager and corresponding first wager-defining data; and
assigning the second at least one payout chip to the second wager and corresponding second wager-defining data.

19. The physical table apparatus of claim 18, wherein the method further comprises:
determining that a plurality of gaming elements detected on the shared physical wager placement position for the wagering opportunity comprise a single wager based on detecting that each of the plurality of gaming elements have been removed from the shared physical wager placement position at a same time as the one of the first at least one payout chip and the second at least one payout chip.

20. The physical table apparatus of claim 13, further comprising:
the first number of physical wager placement positions, each of the physical wager placement positions corresponding to a respective area of a physical table surface on which a gaming element may be placed in order to indicate a wager made by a player; and
at least one gaming element detecting mechanism associated with each of the physical wager placement positions and operable to detect a gaming element being placed on and removed from an associated physical wager placement position of the first number of physical wager placement positions.

21. The physical table apparatus of claim 20, wherein the at least one gaming element detecting mechanism is an RFID antenna.

22. The physical table apparatus of claim 20, wherein the at least one gaming element detecting mechanism is an optical data detecting mechanism.

23. The physical table apparatus of claim 13, wherein the physical table apparatus is configured to facilitate a game of baccarat.

* * * * *